US007419537B2

(12) United States Patent
Fujii et al.

(10) Patent No.: US 7,419,537 B2
(45) Date of Patent: Sep. 2, 2008

(54) PHTHALOCYANINE COLORANT AND USE THEREOF FOR INK-JET PRINTING

(75) Inventors: Takafumi Fujii, Kita-ku (JP); Hirokazu Kitayama, Kita-ku (JP); Shinichi Namba, Kita-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 375 days.

(21) Appl. No.: 10/550,648

(22) PCT Filed: Mar. 29, 2004

(86) PCT No.: PCT/JP2004/004446

§ 371 (c)(1), (2), (4) Date: Sep. 27, 2005

(87) PCT Pub. No.: WO2004/087815

PCT Pub. Date: Oct. 14, 2004

(65) Prior Publication Data

US 2007/0022903 A1 Feb. 1, 2007

(30) Foreign Application Priority Data

Mar. 31, 2003 (JP) ............... 2003-095292
Aug. 8, 2003 (JP) ............... 2003-289492

(51) Int. Cl.
C09D 11/00 (2006.01)
C09D 11/02 (2006.01)
C09B 47/04 (2006.01)
C09B 47/06 (2006.01)

(52) U.S. Cl. ............... 106/31.47; 106/31.49; 540/126; 540/131; 540/136

(58) Field of Classification Search ............... 106/31.47, 106/31.49, 31.77, 31.78; 540/126, 131, 136
See application file for complete search history.

(56) References Cited

U.S. PATENT DOCUMENTS

| | | | | |
|---|---|---|---|---|
| 3,622,263 A | | 11/1971 | Groll et al. ............... 8/178 |
| 4,952,688 A | * | 8/1990 | Springer ............... 540/134 |
| 5,279,622 A | * | 1/1994 | Stawitz et al. ............... 8/661 |
| 5,847,111 A | | 12/1998 | Wald et al. ............... 540/125 |
| 5,922,116 A | | 7/1999 | Mistry et al. ............... 106/31.47 |
| 6,149,722 A | * | 11/2000 | Robertson et al. ............... 106/31.49 |
| 6,190,422 B1 | * | 2/2001 | Carr ............... 8/445 |
| 6,379,441 B1 | * | 4/2002 | Kanaya et al. ............... 106/31.49 |
| 6,569,212 B2 | * | 5/2003 | Carr ............... 8/445 |
| 7,022,171 B2 | * | 4/2006 | Patel et al. ............... 106/31.49 |
| 7,034,149 B2 | | 4/2006 | Hirokazu et al. ............... 540/145 |
| 7,314,273 B2 | * | 1/2008 | Robertson et al. ............... 347/100 |
| 2004/0045478 A1 | | 3/2004 | Tateishi ............... 106/31.49 |
| 2005/0126436 A1 | * | 6/2005 | Patel et al. ............... 106/31.49 |

FOREIGN PATENT DOCUMENTS

| | | |
|---|---|---|
| DE | 728931 | 12/1942 |
| DE | 195 21 056 | 12/1995 |
| EP | 0 418 792 | 3/1991 |
| EP | 0 669 381 | 8/1995 |
| EP | 0 906 943 | 4/1999 |
| EP | 0 985 716 | 3/2000 |
| GB | 2 290 548 | 1/1996 |
| JP | 57-198758 | 12/1982 |
| JP | 59-22967 | 2/1984 |
| JP | 60-208365 | 10/1985 |
| JP | 61-2772 | 1/1986 |
| JP | 62-190273 | 8/1987 |
| JP | 3-185080 | 8/1991 |
| JP | 5-171085 | 7/1993 |
| JP | 7-138511 | 5/1995 |
| JP | 10-140063 | 5/1998 |
| JP | 11-515048 | 12/1999 |
| JP | 2000-303009 | 10/2000 |
| JP | 2002-80762 | 3/2002 |
| JP | 2002-105349 | 4/2002 |
| JP | 2003-34758 | 2/2003 |
| WO | 02/060994 | 8/2002 |

OTHER PUBLICATIONS

International Search Report dated May 18, 2004.
H.R. Schweizer: May 19, 1964; XP002435570 p. 510-511.
Supplemental European Search Report dated May 30, 2007.

* cited by examiner

Primary Examiner—Helene Klemanski
(74) Attorney, Agent, or Firm—Nields & Lemack

(57) ABSTRACT

The present invention relates to a phthalocyanine colorant characterized in that it has, as substituents, at least one unsubstituted sulfamoyl group and at least one substituted sulfamoyl group, the total number of these groups being 2 to 4, the substituent on the substituted sulfamoyl group has a substituted triazinyl group bonded thereto through a crosslinking group, and the unsubstituted sulfamoyl group and the substituted sulfamoyl group are bonded to the phthalocyanine ring at the β-position. Said phthalocyanine colorant is suitable for use in an ink, especially a cyan ink, for an ink-jet printer. A printed matter obtained by printing with said ink is excellent in light fastness, ozone fastness and moisture fastness.

23 Claims, No Drawings

PHTHALOCYANINE COLORANT AND USE THEREOF FOR INK-JET PRINTING

TECHNICAL FIELD

The present invention relates to a phthalocyanine colorant, an ink, an ink set, an ink-jet recording method using the ink or the ink set, a colored product and a method for producing the phthalocyanine colorant.

BACKGROUND OF THE INVENTION

Lately in the field of an image recording material, particularly, a material for forming a color image has been prevalently used, including specifically such as an ink-jet recording material, an image recording material of heat-sensitive transcription type, a recording material using an electronic photography method, a silver halide photosensitive material of transcription type, a printing ink and a recording pen. For LCD and PDP in a display field and for electronic parts of CCD in the field of a movie camera, a color filter is used. In these color image recording materials and color filters, to reproduce or record a full-colored image, a colorant (dye and pigment) of so-called three primary colors in an additive color-mixing method or a subtractive color-mixing method is used. At present, however, a colorant having absorption characteristics to realize a desirable color-reproducing range and fastness to various conditions of use is not actually available and improvement is strongly required.

An ink-jet recording method has rapidly become prevalent and been developing further because of an inexpensive material, high-speed recording capability, low noise in recording and easy color recording. A method for ink-jet recording includes a continuous method to spray liquid droplets continuously and an on-demand method to spray liquid droplets according to an image information signal. A method for jetting the liquid droplets includes such as a method for jetting liquid droplets by pressurization using piezoelectric elements, a method for jetting liquid droplets by generation of bubbles in an ink by heating, a method for using an ultrasonic wave and a method for sucking and jetting liquid droplets by static electricity force. An ink suitable for ink-jet recording includes, for example, a water-based ink, an oil-based ink and a solid (melt type) ink.

A colorant to be used for the ink suitable for such ink-jet recording is required to have high solubility or dispersibility in a solvent, to be capable of high-concentration recording, to have good hue, to have satisfactory fastness against light, heat and an active gas (for example, an oxidizing gas such as $NO_x$ and ozone, and $SO_x$) in the environment, to have superior fastness against water and chemicals, to have good fixation on a recording material with little blurring, to be superior in shelf life as an ink, to be free from toxicity and further to be available at a low price. In particular, such a cyan colorant has been strongly desired as has good cyan hue, along with excellent light fastness (durability to light), ozone fastness (durability to ozone gas) and moisture fastness (durability under high humidity) and free from bronze phenomenon (also called bronzing phenomenon). Bronze phenomenon means phenomenon that a colorant glares like metal chips on the surface of a glossy paper, and the like caused by colorant association or insufficient absorption of an ink. This phenomenon impairs gloss, print quality and print concentration.

Typical skeleton of a water-soluble cyan colorant to be used for an ink suitable for ink-jet recording include phthalocyanines and triphenylmethanes. A typical phthalocyanine series colorant reported and used most widely includes the following phthalocyanine derivatives classified into A to H.

A: A known phthalocyanine series colorant such as Direct Blue 86, Direct Blue 87, Direct Blue 199, Acid Blue 249 and Reactive Blue 71.

B: A phthalocyanine series colorant disclosed in JP Laid-Open No. 190273/1987 (Literature 1), JP Laid-Open No. 138511/1995 (Literature 2), JP Laid-Open No. 105349/2002 (Literature 3) and the like [for example, Cu—Pc—$(SO_3Na)_m(SO_2NH_2)_n$: a mixture wherein m+n=1 to 4].

C: A phthalocyanine series colorant disclosed in JP Laid-Open No. 171085/1993 (Literature 4) and the like [for example, Cu—Pc—$(CO_2H)_m(CONR_1R_2)_n$: m+n=0 to 4].

D: A phthalocyanine series colorant disclosed in JP Laid-Open No. 140063/1998 (Literature 5) and the like [for example, Cu—Pc—$(SO_3H)_m(SO_2NR_1R_2)_n$: m+n=1 to 4; and m≠0].

E: A phthalocyanine series colorant disclosed in JP Laid-Open No. 515048/1999 (Literature 6) and the like [for example, Cu—Pc—$(SO_3H)l(SO_2NH_2)_m(SO_2NR_1R_2)_n$: l+m+n=0 to 4].

F: A phthalocyanine series colorant disclosed in JP Laid-Open No. 22967/1984 (Literature 7) and the like [for example, Cu—Pc—$(SO_2NR_1R_2)_n$: n=1 to 5].

G: A phthalocyanine series colorant disclosed in JP Laid-Open No. 303009/2000 (Literature 8), JP-A-2002-249677/2002 (Literature 9) and the like [a phthalocyanine compound with substituents at controlled positions, a phthalocyanine series colorant with substituents at the β-position: On the β-position, see description at the later section].

H: A phthalocyanine series colorant having a pyridine ring disclosed in JP Laid-Open No. 34758/2003 (Literature 10) and the like.

A phthalocyanine series colorant used prevalently today and represented by Direct Blue 86 or Direct Blue 199 is characterized by having superior light fastness to a generally known magenta dye or yellow dye. A phthalocyanine series colorant gives a greenish hue under acidic conditions, and thus is not very preferable as a cyan ink. Therefore, when these dyes are used as a cyan ink, it is preferable to use them under neutral to basic conditions. However, even when an ink is used in neutral to basic conditions, a printed hue possibly undergoes a big change on an acid recording paper.

Moreover, an oxidizing gas such as a nitrogen oxide gas and ozone that is often writing up lately as an environmental issue causes the color to change to a greenish hue and to fade, and optical density of printing to deteriorate.

On the other hand, a triphenylmethane series dye is much inferior in light fastness, ozone fastness and moisture fastness although its hue is good.

With increase in application field being used in a display such as an advertisement in the future, leading to more chances of getting exposed to light and active gases in the environment, such an inexpensive colorant and ink will be more and more required as has good hue and superior fastness against light and an active gas (for example, an oxidizing gas such as $NO_x$ and ozone, and $SO_x$) in the environment. However, it is difficult to develop such a cyan colorant (for example, phthalocyanine series colorant) and a cyan ink as satisfies these requirements at a high level. Although a phthalocyanine series colorants with active-gas fastness have been disclosed so far in the above Literatures 3 and 8 to 10 and JP Laid-Open No. 80762/2002 (Literature 11), such a cyan colorant and a cyan ink have not yet been obtained as can satisfy all qualities such as hue, light fastness, ozone fastness and moisture fastness and be produced at a low cost. Accordingly, market requirements have not yet been satisfied sufficiently.

A subject of the present invention is to solve the above conventional problems and attain the following object. Specifically, an object of the present invention is to provide a novel phthalocyanine colorant that has good hue as a cyan ink and is superior in light fastness, ozone fastness and moisture fastness, an ink suitable for an ink-jet using said phthalocyanine colorant and an ink-jet recording method.

DISCLOSURE OF THE INVENTION

After studying in detail phthalocyanine series colorants having good hue, excellent light fastness and ozone fastness, the present inventors have found that the above problems can be solved by using a specific phthalocyanine series colorant as a colorant for an ink and thus have completed the present invention. In more detail, the present invention relates to a metallo phthalocyanine colorant represented by Formula (1) as shown below, having both a sulfamoyl group substituted by substituents having triazinyl ring and an unsubstituted sulfamoyl group at a specific substitution position (β-position: to be described later), the present inventors have found that said has good cyan hue and is superior in light fastness (durability to light), moisture fastness (durability under high humidity) and also ozone fastness (durability to ozone gas) and free from bronze phenomenon (also called bronzing phenomenon) and have completed the present invention. The present invention will be described in detail hereinbelow.

1. A phthalocyanine colorant represented by Formula (1):

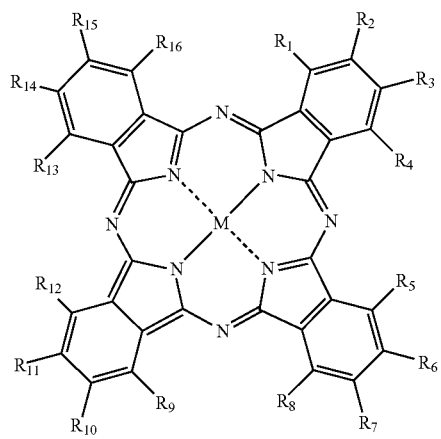

(1)

[in Formula (1), M represents a hydrogen atom, a metal atom, a metal oxide, a metal hydroxide, or a metal halide; $R_2$, $R_3$, $R_6$, $R_7$, $R_{10}$, $R_{11}$, $R_{14}$ and $R_{15}$ each independently represent an unsubstituted sulfamoyl group represented by Formula (2), a substituted sulfamoyl group represented by Formula (3), or a hydrogen atom, provided that at least one of $R_2$, $R_3$, $R_6$, $R_7$, $R_{10}$, $R_{11}$, $R_{14}$ and $R_{15}$ is an unsubstituted sulfamoyl group, and at least one thereof is a substituted sulfamoyl group represented by Formula (3); and $R_1$, $R_4$, $R_5$, $R_8$, $R_9$, $R_{12}$, $R_{13}$ and $R_{16}$ represent hydrogen atoms; the sum of a number of an unsubstituted sulfamoyl group and a number of a substituted sulfamoyl group is 2 to 4, and a number of an unsubstituted sulfamoyl group is 1 to 3 and a number of a substituted sulfamoyl group is

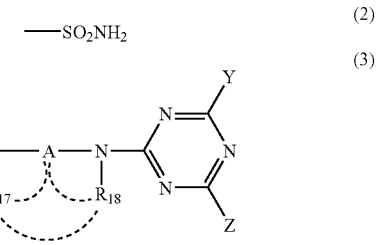

[in Formula (3), $R_{17}$ and $R_{18}$ each independently represent a hydrogen atom, a substituted or unsubstituted alkyl group, a substituted or unsubstituted cycloalkyl group, a substituted or unsubstituted aryl group, a substituted or unsubstituted heterocyclic group, and a substituted or unsubstituted alkenyl group; A represents a crosslinking group, and adjacent $R_{17}$, $R_{18}$ and A may form a ring by bonding together; Y and Z each independently represent a halogen atom, a hydroxyl group, a sulfonic acid group, a carboxyl group, an amino group, a substituted or unsubstituted alkoxy group, a substituted or unsubstituted cycloalkyloxy group, a substituted or unsubstituted aryloxyl group, a substituted or unsubstituted heterocyclic oxy group, a substituted or unsubstituted alkenyloxy group, a substituted or unsubstituted alkylamino group, a substituted or unsubstituted cycloalkylamino group, a substituted or unsubstituted arylamino group, a substituted or unsubstituted heterocyclic amino group, a substituted or unsubstituted alkenylamino group, a substituted or unsubstituted dialkylamino group, a substituted or unsubstituted alkylthio group, a substituted or unsubstituted arylthio group, a substituted or unsubstituted heterocyclic thio group, a substituted or unsubstituted alkenylthio group, provided that at least one of Y and Z is a group having an ionic and hydrophilic group as a substituent.]

2. The phthalocyanine colorant according to claim 1, wherein Formula (1) according to claim 1 is represented by Formula (4) wherein M is Cu:

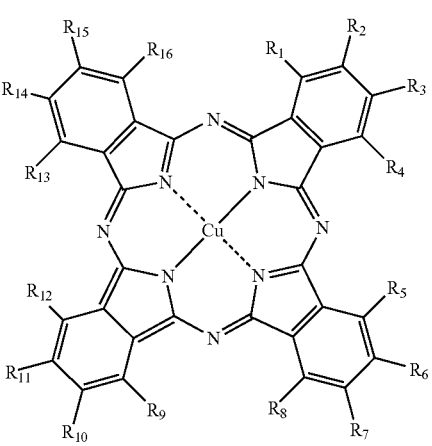

(4)

[wherein $R_1$ to $R_{16}$ mean the same as in Formula (1)].

3. The phthalocyanine colorant according to claim 1 or 2, wherein the crosslinking group A is an alkylene, a cycloalkylene, or an arylene group.

4. The phthalocyanine colorant according to any one of claims 1 to 3, wherein in each of combinations of $R_2$ and $R_3$, $R_6$ and $R_7$, $R_{10}$ and $R_{11}$, and $R_{14}$ and $R_{15}$, one member of each combination is a hydrogen atom, and the other is an unsubstituted sulfamoyl group represented by Formula (2), a substituted sulfamoyl group represented by Formula (3) or a hydrogen atom, and among $R_2$, $R_3$, $R_6$, $R_7$, $R_{10}$, $R_{11}$, $R_{14}$ and $R_{15}$, at least one is an unsubstituted sulfamoyl group and at least one is a substituted sulfamoyl group represented by Formula (3).

5. The phthalocyanine colorant according to claim 1 or 2, wherein a substituted sulfamoyl group of Formula (3) is a group represented by Formula (5) as shown below:

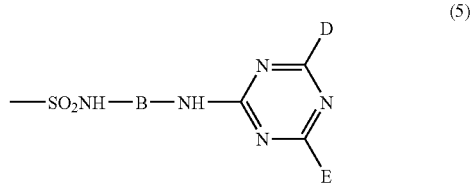

(5)

[in Formula (5), B represents an alkylene, arylene, or xylylene group; D and E each independently represent a chlorine atom, a hydroxyl group, a sulfonic acid group, a carboxyl group, an amino group, an alkoxy group (which may be substituted with a substituent selected from a group consisting of a sulfonic acid group, a carboxyl group, a hydroxyl group, a dialkylamino group, an arylamino group, an acetylamino group, an alkoxy group, an aryl group, a cyano group and a halogen atom), a phenoxyl group (which may be substituted with one or two or more substituents selected from a group consisting of a sulfonic acid group, a carboxyl group, a ureide group, an alkyl group and an alkoxy group), a naphthoxyl group (which may be substituted with one or two or more substituents selected from a group consisting of a sulfonic acid group and an acetylamino group), a benzyloxyl group (which may be substituted with a sulfonic acid group), a phenetyloxyl group (which may be substituted with a sulfonic acid group), an alkylamino group (which may be substituted with a substituent selected from a group consisting of a sulfonic acid group, a carboxyl group, a hydroxyl group, an alkoxy group, a dialkylamino group, an arylamino group, an aryl group, a halogen atom and a cyano group), an anilino group (which may be substituted with one or two or more substituents selected from a group consisting of a sulfonic acid group, a carboxyl group, a hydroxyl group, a dialkylamino group, an arylamino group, an acetylamino group, a ureide group, an alkyl group, an alkoxy group, a nitro group, a cyano group, a heterocyclic group and a halogen atom), a naphtylamino group (which may be substituted with a sulfonic acid group or a hydroxyl group), a benzylamino group (which may be substituted with a sulfonic acid group), a phenetylamino group (which may be substituted with a sulfonic acid group), an alkylthio group (which may be substituted with a sulfonic acid group, a carboxylic group or a hydroxyl group), or an arylthio group (which may be substituted with one or two or more substituents selected from a group consisting of a sulfonic acid group, a carboxyl group, a hydroxyl group, and an alkyl group), and at least one of D and E has, as a substituent, an ionic and hydrophilic group selected from a group consisting of a sulfonic acid group and a carboxyl group.]

6. The phthalocyanine colorant according to claim 1, wherein either one of Y and Z is an amino group, or a substituted or unsubstituted alkylamino group, and the other is a group other than a halogen and a hydroxyl group.

7. The phthalocyanine colorant according to claim 6, wherein a group other than a halogen and a hydroxyl group is an arylamino group substituted with a sulfonic acid group.

8. The phthalocyanine colorant according to claim 1, wherein content of a colorant of Formula (1) is at least 60% based on the total amount of colorants.

9. The phthalocyanine colorant according to any one of claims 1 to 8, wherein the colorant of Formula (1) is obtained by subjecting the phthalocyanine colorant or the salt thereof represented by Formula (6) to a reaction with a chlorinating reagent to convert a sulfonic acid group to a chlorosulfonic acid group, followed by further reaction with an organic amine represented by Formula (X) as shown below and an amidating reagent:

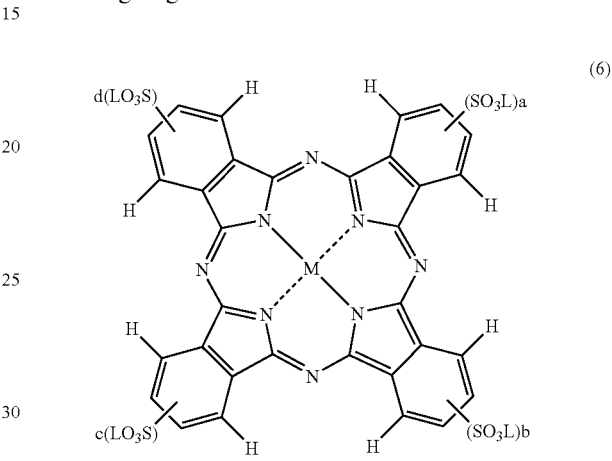

(6)

[in Formula (6), M represents a hydrogen atom, a metal atom, a metal oxide, a metal hydroxide or a metal halide; L represents a hydrogen atom, an alkali metal ion, an alkali earth metal ion, an onium ion of an organic amine or an ammonium ion; a, b, c and d is 0 or 1, and the sum thereof is an integer of 2 to 4.]:

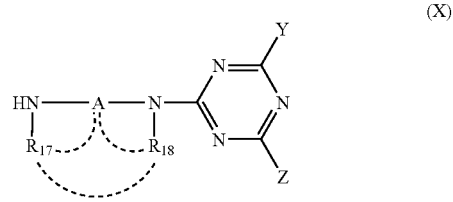

(X)

[in Formula (X), $R_{17}$ and $R_{18}$ each independently represent a hydrogen atom, a substituted or unsubstituted alkyl group, a substituted or unsubstituted cycloalkyl group, a substituted or unsubstituted aryl group, a substituted or unsubstituted heterocyclic group, and a substituted or unsubstituted alkenyl group; A represents a crosslinking group, and adjacent $R_{17}$, $R_{18}$ and A may form a ring by bonding together; Y and Z each independently represent a halogen atom, a hydroxyl group, a sulfonic acid group, a carboxyl group, an amino group, a substituted or unsubstituted alkoxy group, a substituted or unsubstituted cycloalkyloxy group, a substituted or unsubstituted aryloxyl group, a substituted or unsubstituted heterocyclic oxy group, a substituted or unsubstituted alkenyloxy group, a substituted or unsubstituted alkylamino group, a substituted or unsubstituted cycloalkylamino group, a substituted or unsubstituted arylamino group, a substituted or unsubstituted heterocyclic amino group, a substituted or unsubstituted alkenylamino group, a substituted or unsubstituted dialkylamino group, a substituted or unsubstituted alkylthio group, a substituted or unsubstituted arylthio group, a substituted or unsubstituted heterocyclic thio group, a substituted or unsubstituted alkenylthio group, provided that at least one of Y and Z is a group having an ionic and hydrophilic group as a substituent.]

10. A phthalocyanine colorant, which is obtained by subjecting derivatives of 4-sulfophthalic acid to reaction with themselves or subjecting a derivative of 4-sulfophthalic acid to reaction with a derivative of a phthalic acid (anhydride) in the presence of a metallic compound to obtain a sulfometallo phthalocyanine compound, which is reacted with a chlorinating reagent to convert a sulfonic acid group to a chlorosulfonic acid group, followed by further reaction with an amidating reagent and an organic amine represented by Formula (X) as shown below:

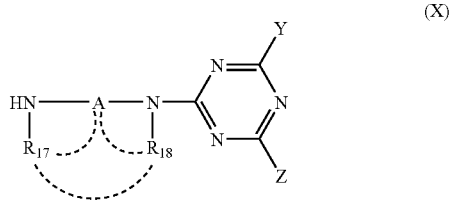

(in Formula (X), $R_{17}$, $R_{18}$, A, Y and Z represent the same meaning as described above.]

11. The phthalocyanine colorant according to claim 10, wherein the crosslinking group A is an alkylene, a cycloalkylene, or an arylene group.

12. The phthalocyanine colorant according to claim 10 or 11, wherein the organic amine represented by Formula (X) is represented by Formula (X') as shown below:

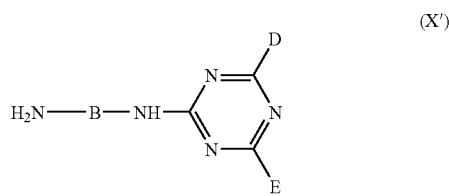

[in Formula (X'), B represents an alkylene, an arylene, or a xylylene group; D and E each independently represent a chlorine atom, a hydroxyl group, a sulfonic acid group, a carboxyl group, an amino group, an alkoxy group (which may be substituted with a substituent selected from a group consisting of a sulfonic acid group, a carboxyl group, a hydroxyl group, a dialkylamino group, an arylamino group, an acetylamino group, an alkoxy group, an aryl group, a cyano group and a halogen atom), a phenoxyl group (which may be substituted with one or two or more substituents selected from a group consisting of a sulfonic acid group, a carboxyl group, a ureide group, an alkyl group and an alkoxy group), a naphthoxyl group (which may be substituted with one or two or more substituents selected from a group consisting of a sulfonic acid group and an acetylamino group), a benzyloxyl group (which may be substituted with a sulfonic acid group), a phenetyloxyl group (which may be substituted with a sulfonic acid group), an alkylamino group (which may be substituted with a substituent selected from a group consisting of a sulfonic acid group, a carboxyl group, a hydroxyl group, an alkoxy group, a dialkylamino group, an arylamino group, an aryl group, a halogen atom and a cyano group), an anilino group (which may be substituted with one or two or more substituents selected from a group consisting of a sulfonic acid group, a carboxyl group, a hydroxyl group, a dialkylamino group, an arylamino group, an acetylamino group, a ureide group, an alkyl group, an alkoxy group, a nitro group, a cyano group, a heterocyclic group and a halogen atom), a naphtylamino group (which may be substituted with a sulfonic acid group or a hydroxyl group), a benzylamino group (which may be substituted with a sulfonic acid group), a phenetylamino group (which may be substituted with a sulfonic acid group), an alkylthio group (which may be substituted with a sulfonic acid group, a carboxylic group or a hydroxyl group), or an arylthio group (which may be substituted with one or two or more substituents selected from a group consisting of a sulfonic acid group, a carboxyl group, a hydroxyl group and an alkyl group); and at least one of D and E has, as a substituent, an ionic and hydrophilic group selected from a group consisting of a sulfonic acid group and a carboxyl group.]

13. The phthalocyanine colorant according to any one of claims 10 to 12, wherein the metallic compound is a copper compound.

14. An ink characterized by comprising, as a colorant component, the phthalocyanine colorant according to any one of claims 1 to 13.

15. The ink according to claim 14, which comprises an organic solvent.

16. The ink according to claims 14 or 15, which is for ink-jet recording use.

17. An ink set characterized by using the ink according to any one of claims 14 to 16 as at least one kind in an ink-jet printer which uses at least two kinds of cyan inks having different colorant concentrations.

18. An ink-jet recording method characterized by using, as an ink, the ink or the ink set according to any one of claims 14 to 17, in an ink-jet recording method wherein recording is conducted onto a recording material by jetting ink droplets in response to recording signals.

19. The ink-jet recording method according to claim 18, wherein the recording material is a sheet for information transmission.

20. The ink-jet recording method according to claim 19, wherein the sheet for information transmission is a surface-treated sheet and a sheet having an ink image receiving layer which contains white inorganic pigment particles on a backing material.

21. A container comprising the ink or the ink set according to any one of claims 14 to 17.

22. An ink-jet printer comprising the container according to claim 21.

23. A colored product which is colored with the ink or the ink set according to any one of claims 14 to 17.

24. A method for producing a phthalocyanine colorant characterized by being obtained by subjecting derivatives of 4-sulfophthalic acid to reaction with themselves or subjecting a derivative of 4-sulfophthalic acid to reaction with a derivative of a phthalic acid (anhydride) in the presence of a copper compound to obtain a compound or a salt thereof, which is reacted with a chlorinating reagent to convert a sulfonic acid group to a chlorosulfonyl group, followed by further reaction with an organic amine represented by the above Formula (X) and an amidating reagent.

25. A phthalocyanine colorant which has not less than 60% of a compound substituted at the β-position and not more than 40% of a compound substituted at the α-position in a phthalocyanine colorant represented by Formula (14) as shown below:

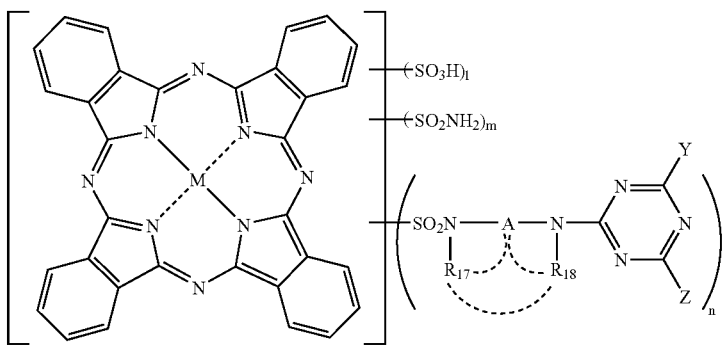

(14)

[wherein M represents a hydrogen atom, a metal atom, a metal oxide, a metal hydroxide or a metal halide; l includes 0 and lower than 1; n is not smaller than 0.3 and not larger than 3; m is not smaller than 1 and not larger than 3.7, and the sum of l, m and n is not smaller than 2 and not larger than 4; $R_{17}$ and $R_{18}$ each independently represent a hydrogen atom, a substituted or unsubstituted alkyl group, a substituted or unsubstituted cycloalkyl group, a substituted or unsubstituted aryl group, a substituted or unsubstituted heterocyclic group, and a substituted or unsubstituted alkenyl group; and A represents a crosslinking group, and adjacent $R_{17}$, $R_{18}$ and A may form a ring by bonding together; Y and Z each independently represent a halogen atom, a hydroxyl group, a sulfonic acid group, a carboxyl group, an amino group, a substituted or unsubstituted alkoxy group, a substituted or unsubstituted cycloalkyloxy group, a substituted or unsubstituted aryloxy group, a substituted or unsubstituted heterocyclic oxy group, a substituted or unsubstituted alkenyloxy group, a substituted or unsubstituted alkylamino group, a substituted or unsubstituted cycloalkylamino group, a substituted or unsubstituted arylamino group, a substituted or unsubstituted heterocyclic amino group, a substituted or unsubstituted alkenylamino group, a substituted or unsubstituted dialkylamino group, a substituted or unsubstituted alkylthio group, a substituted or unsubstituted arylthio group, a substituted or unsubstituted heterocyclic thio group, a substituted or unsubstituted alkenylthio group, provided that at least one of Y and Z is a group having an ionic and hydrophilic group as a substituent.]

26. The phthalocyanine colorant according to claim 25, wherein either one of Y and Z is an amino group, or a substituted or unsubstituted alkylamino group, and the other is a group other than a halogen and a hydroxyl group.

27. The phthalocyanine colorant according to claim 26, wherein a group other than a halogen and a hydroxyl group is an arylamino group substituted with a sulfonic acid group.

28. The phthalocyanine colorant according to claim 25, wherein M represents a copper atom; A represents a divalent crosslinking group having carbon atoms of 1 to 6; l includes 0 and smaller than 1; n is not smaller than 0.3 and not larger than 3; m is not smaller than 1 and not higher than 3.7; and the sum of l, m and n is 2 to 4; both $R_{17}$ and $R_{18}$ represent hydrogen atoms; Y and Z each independently represent an amino group, a substituted or unsubstituted alkylamino group, a substituted or unsubstituted arylamino group, a substituted or unsubstituted dialkylamino group, provided that at least one of Y and Z is a group having an ionic and hydrophilic group as a substituent.

BEST MODE FOR CARRYING OUT THE INVENTION

The present invention will be described in detail hereinbelow.

A colorant of the present invention represented by the above Formula (1) is obtained by subjecting 4-sulfophthalic acid derivatives to reaction with themselves or subjecting a 4-sulfophthalic acid derivative to reaction with a phthalic acid (phthalic anhydride) derivative in the presence of a metallic compound, followed by reaction of thus obtained product with a chlorination agent to convert a sulfonic acid group to a chlorosulfonyl group, further reaction with an amidation agent and a specific organic amine and introducing an unsubstituted sulfamoyl group and a substituted sulfamoyl group at a specific substitution position (β-position) of a phthalocyanine ring. A printed material using said colorant shows very superior fastness to ozone gas.

In general, a phthalocyanine derivative may contain substitution position isomers of substituents $R_1$ to $R_{16}$ in Formula (1) as shown below, that are formed inevitably in synthesizing thereof and these substitution position isomers are often regarded as the same derivatives without being distinguished each other:

Formula (1)

(In Formula (1), M and $R_1$ to $R_{16}$ represent each the same meaning as the above).

For the sake of convenience in the present description, three kinds of phthalocyanine derivatives having a different substitution position are classified as defined below into a substitution type at the β-position (1), an substitution type at the α-position (2) and a mixed substitution type at α- and β-positions (3), which are used in explaining phthalocyanine derivatives having different substitution positions.

In the following explanation, the 1st to the 16th substitution positions represent the position on a benzene ring to which substituent of $R_1$ to $R_{16}$ is bonded, respectively, which should be similar hereinbelow in the present description.

(1) a substitution type at the β-position: a phthalocyanine colorant having a specific substituent (a sulfonic acid group, a sulfamoyl group or a substituted sulfamoyl group in the present description) at the 2nd and/or 3rd, 6th and/or 7th, 10th and/or 11th, and 14th and/or 15th positions.

(2) a substitution type at the α-position: a phthalocyanine colorant having a specific substituent at the 1st and/or 4th, 5th and/or 8th, 9th and/or 12th, and 13th and/or 16th positions.

(3) a mixed substitution type at the α- and β-positions: a phthalocyanine colorant having a specific substituent at an optional position among the 1st to 16th positions.

A phthalocyanine colorant of the present invention represented by Formula (1) belongs to the above substitution type at the β-position. Whether a substituted phthalocyanine colorant produced using a method for the present invention is a substitution type at the β-position or a substitution type at the α-position or a mixed substitution type at the α- and β-positions can be predicted from position of a substituent in a raw material, a phthalic acid derivative (because thus obtained phthalocyanine colorant has also a substituent at the corresponding position). Otherwise, the type of a phthalocyanine colorant can be confirmed by decomposing it to a phthalic acid derivative using nitric acid, and the like, and examining the substitution position in the derivative using NMR.

In the above Formula (1), M represents a hydrogen atom, a metal atom, a metal oxide, a metal hydroxide or a metal halide. A metal atom includes specifically, for example, Li, Na, K, Mg, Ti, Zr, V, Nb, Ta, Cr, Mo, W, Mn, Fe, Co, Ni, Ru, Rh, Pd, Os, Ir, Pt, Cu, g, Au, Zn, Cd, Hg, Al, Ga, In, Si, Ge, Sn, Pb, Sb, and Bi. A metal oxide includes such as VO and GeO. A metal hydroxide includes, for example, $Si(OH)_2$, $Cr(OH)_2$, $Sn(OH)_2$ and AlOH. A metal halide includes, for example, $SiCl_2$, VCl, $VCl_2$, VOCl, FeCl, GaCl, ZrCl and AlCl. Among these, Cu, Ni, Zn, Al and AlOH are preferable and Cu is most preferable.

Unless otherwise stated in the present description, the number of carbon atoms is not limited especially in an alkyl group, an alkoxy group, an alkenyl group, a cycloalkyl group, an alkylene group and the like, as long as the object of the present invention can be attained. The approximate number of carbon atoms in these groups is usually 1 to 16, preferably 1 to 12, more preferably 1 to 6 and still more preferably 1 to 4. However, it is usually 3 to 12, preferably about 5 to 8 in a cycloalkyl group. The kind of a substituent contained in these groups is not limited especially as long as the object of the present invention can be attained. A preferable substituent on the carbon chain of these groups includes, for example, a sulfonic acid group and a group derived therefrom (sulfamoyl group, etc.), a carboxyl group and a group derived therefrom (carboxylate ester group, etc.), a phosphoric acid group and a group derived therefrom (phosphate ester group, etc.), a hydroxyl group, a substituted or unsubstituted alkoxy group, a substituted or unsubstituted amino group, a substituted or unsubstituted aryl group, a halogen atom and a cyano group.

The kind of an aryl group is not limited especially as long as the object of the present invention can be attained. A phenyl group or a naphthyl group is usually used. A preferable substituent on an aryl group includes, for example, a substituent mentioned as a preferable substituent on the above carbon chain, and a ureido group, a nitro group and a heterocyclic group.

In the above Formula (3) and Formula (X), $R_{17}$ and $R_{18}$ represent each independently a hydrogen atom, a substituted or unsubstituted alkyl group, a substituted or unsubstituted cycloalkyl group, a substituted or unsubstituted aryl group, a substituted or unsubstituted heterocyclic group and a substituted or unsubstituted alkenyl group.

The above substituted or unsubstituted alkyl group includes, for example, an alkyl group of 1 to 12 carbon atoms. Said substituent includes, for example, a sulfonic acid group, a carboxyl group, a phosphoric acid group, a hydroxyl group, an alkoxy group, an amino group (which may be substituted with an alkyl group, an aryl group and an acetyl group), an aryl group, a halogen atom and a cyano group.

The above substituted or unsubstituted cycloalkyl group includes, for example, a cycloalkyl group of 3 to 12 carbon atoms, preferably a cycloalkyl group of 5 to 8 carbon atoms. Said substituent in the cycloalkyl group includes, for example, a sulfonic acid group, a carboxyl group, a phosphoric acid group, a hydroxyl group, an alkoxy group, an amino group (which may be substituted with an alkyl group, an aryl group and an acetyl group), an aryl group, a halogen atom and a cyano group.

An alkyl group of the above alkyl group substituted with the above aryl group (an aralkyl group) has preferably about 1 to 12 carbon atoms. Said aralkyl group may have a substituent that includes, for example, a sulfonic acid group, a carboxyl group, a phosphoric acid group, a hydroxyl group, an alkoxy group, an amino group (which may be substituted with an alkyl group, an aryl group and an acetyl group), an aryl group, a halogen atom and a cyano group.

An aryl group in the above substituted or unsubstituted aryl group includes, for example, a phenyl group and a naphthyl group. The substituent includes, for example, a sulfonic acid group, a carboxyl group, a phosphoric acid group, a hydroxyl group, an amino group (which may be substituted with an alkyl group, an aryl group and an acetyl group), a ureido group, an alkyl group, an alkoxy group, a nitro group, a cyano group, a heterocyclic group and a halogen atom.

The above substituted or unsubstituted heterocyclic group is preferably a five-membered or six-membered ring, which may be further fused and may be an aromatic heterocycle or a nonaromatic heterocycle. The heterocycle includes, for example, pyridine, pyrazine, pyrimidine, pyridazine, triazine, quinoline, isoquinoline, quinazoline, cinnoline, phthalazine, quinoxaline, pyrrol, indole, furan, benzofuran, thiophene, benzothiophene, pyrazole, imidazole, benzimidazole, triazole, oxazole, benzoxazole, thiazole, benzothiazole, isothiazole, benzisothiazole, pyrrolidine, piperidine, piperazine, imidazolidine and thiazoline. These heterocycles may have a substituent such as a sulfonic acid group, a carboxyl group, a phosphoric acid group, a hydroxyl group, an amino group (which may be substituted with an alkyl group, an aryl group or an acetyl group), a ureido group, an alkyl group, an alkoxy group, a nitro group, a cyano group and a halogen atom.

The above substituted or non-substituted alkenyl group includes a $C_{1-12}$ alkenyl group. Examples of the substituent include a sulfonic acid group, a carboxyl group, a phosphoric acid group, a hydroxyl group, alkoxy group, an amino group (which may be substituted with an alkyl group, an aryl group or an acetyl group), an aryl group, a halogen atom and a cyano group.

"A" in the above Formula (3) and Formula (X) represents a crosslinking group. The crosslinking group usually includes a divalent hydrocarbon crosslinking group of, for example, 1 to 16 carbon atoms, preferably 1 to 6 carbon atoms. Said crosslinking group includes, for example, an alkylene, a cycloalkylene and an arylene group, and a group formed by combining these groups, for example, a xylylene group. The crosslinking group may be formed by combining with $R_{17}$ and $R_{18}$. The crosslinking group may have a substituent, which includes, for example, a sulfonic acid group, a carboxyl group and a hydroxyl group.

The alkylene group includes, for example, an alkylene group of 1 to 16 carbon atoms. A part of the carbon atoms of the alkylene group may be substituted with a nitrogen, oxygen and sulfur atom. Also may be included a group formed by combination of an alkylene group and a cycloalkylene group. An alkylene group of 1 to 4 carbon atoms is preferable.

The cycloalkylene group includes, for example, a cycloalkylene group of 1 to 16 carbon atoms. A part of the carbon atoms of the cycloalkylene group may be substituted with a nitrogen, oxygen and sulfur atom. Also may be included is a group formed by combination of an alkylene group and a cycloalkylene group. The cycloalkylene group may be a hydrocarbon having a crosslinked ring or a hydrocarbon having a spiro ring.

The arylene group includes, for example, phenylene and naphthylene group, which may have a substituent. The substituent includes, for example, a sulfonic acid group, a carboxyl group, a phosphoric acid group, a hydroxyl group, an amino group (which may be substituted with an alkyl group, an aryl group and an acetyl group), a ureido group, an alkyl group, an alkoxy group, a nitro group, a cyano group and a halogen atom.

In the above Formula (3) and Formula (X), Y and Z represent each independently a halogen atom, a hydroxyl group, a sulfonic acid group, a carboxyl group, an amino group, a substituted or unsubstituted alkoxy group, a substituted or unsubstituted cycloalkoxy group, a substituted or unsubstituted aryloxyl group, a substituted or unsubstituted heterocycloxyl group, a substituted or unsubstituted aralkyloxy group, a substituted or unsubstituted alkenyloxy group, a substituted or unsubstituted alkylamino group, a substituted or unsubstituted dialkylamino group, a substituted or unsubstituted arylamino group, a substituted or unsubstituted heterocyclic amino group, a substituted or unsubstituted aralkylamino group, a substituted or unsubstituted alkenylamino group, a substituted or unsubstituted alkylthio group, a substituted or unsubstituted arylthio, a substituted or unsubstituted heterocyclic thio group and a substituted or unsubstituted alkenylthio group, provided that at least one of Y and Z has an ionic and hydrophilic group as a substituent. As the ionic and hydrophilic group, an anionic and hydrophilic group is preferable, including such as a sulfonic acid group, a carboxyl group and a phosphoric acid. Among these, a sulfonic acid group or a carboxyl group is preferable, and a sulfonic acid group is more preferable. The number of the ionic and hydrophilic groups contained in both of Y and Z is preferably 2 or more, usually 2 to 4 in total.

These ionic and hydrophilic groups may be a free form or an alkali metal salt, an alkaline-earth metal salt, or an onium ion salt of an organic amine or an ammonium salt. The alkali metal includes, for example, sodium, potassium and lithium. The alkaline-earth metal includes, for example, calcium and magnesium. The organic amine includes, for example, an alkylamine and an alkanolamine. The alkylamine includes, for example, a lower alkylamine of 1 to 4 carbon atoms such as methylamine and ethylamine. The alkanolamine includes, for example, a mono-, di- or tri-C1-C4 lower alkanolamine such as monoethanolamine, diethanolamine, triethanolamine, monoisopropanolamine, diisopropanolamine and triisopropanolamine. The preferable salt includes a salt of ammonium, sodium, potassium, lithium, monoethanolamine, diethanolamine, triethanolamine, monoisopropanolamine, diisopropanolamine and triisopropanolamine. A salt of an alkali metal such as sodium or lithium is usually used.

Preferable Y and Z are each independently a substituted or unsubstituted amino groups. The substituted amino group is preferably an arylamino group that may have a substituent or an C1-C6 alkylamino group that may have a substituent. The arylamino group that may have a substituent is preferably a phenylamino or naphthylamino group substituted with an ionic and hydrophilic group. The C1-C6 alkylamino group that may have a substituent is preferably a C1-C6 alkylamino group substituted with an ionic and hydrophilic group. Said alkylamino group may be either a mono- or dialkylamino group, but is preferably a monoalkylamino group. A more preferable combination of Y and Z is a case that one is an amino group or a C1-C6 alkylamino group substituted with an ionic and hydrophilic group and the other is a phenylamino group or a naphthylamino group substituted with an ionic and hydrophilic group. The ionic and hydrophilic group is preferably a sulfonic acid group or a carboxyl group, more preferably a sulfonic acid group.

The above substituted or unsubstituted alkoxy group includes, for example, an alkoxy group of 1 to 12 carbon atoms. The substituent includes, for example, a sulfonic acid group, a carboxyl group, a phosphoric acid group, a hydroxyl group, an alkoxy group, an amino group (which may be substituted with an alkyl group, an aryl group and an acetyl group), an aryl group, a halogen atom and a cyano group. Among these groups, a sulfonic acid group, a carboxyl group, a phosphoric acid group and a hydroxyl group are preferable.

The above substituted or unsubstituted cycloalkoxy group includes, for example, a cycloalkoxy group of 1 to 12 carbon atoms. The substituent includes, for example, a sulfonic acid group, a carboxyl group, a phosphoric acid group, a hydroxyl group, an alkoxy group, an amino group (which may be substituted with an alkyl group, an aryl group and an acetyl group), an aryl group, a halogen atom and a cyano group. Among these groups, a sulfonic acid group, a carboxyl group, a phosphoric acid group and a hydroxyl group are preferable.

The above substituted or unsubstituted aryloxyl group includes, for example, a phenoxyl group and a naphthoxyl group. The substituent includes, for example, a sulfonic acid group, a carboxyl group, a phosphoric acid group, a hydroxyl group, an amino group (which may be substituted with an alkyl group, an aryl group and an acetyl group), a ureido group, an alkyl group, an alkoxy group, a nitro group, a cyano group, a heterocyclic group and a halogen atom. Among these groups, a sulfonic acid group, a carboxyl group, a phosphoric acid group and a hydroxyl group are preferable. The above substituted or unsubstituted heterocyclic oxy group is preferably a five-membered or six-membered ring, which may further be fused and may be an aromatic heterocycle or a non-aromatic heterocycle. The heterocycle includes, for example, pyridine, pyrazine, pyrimidine, pyridazine, triazine, quinoline, isoquinoline, quinazoline, cinnoline, phthalazine, quinoxaline, pyrrol, indole, furan, benzofuran, thiophene, benzothiophene, pyrazole, imidazole, benzimidazole, triazole, oxazole, benzoxazole, thiazole, benzothiazole, isothiazole, benzisothiazole, pyrrolidine, piperidine, piperazine, imidazolidine and thiazoline. These heterocycles may have a substituent such as a sulfonic acid group, a carboxyl group, a phosphoric acid group, a hydroxyl group, an amino group (which may be substituted with an alkyl group, an aryl group or an acetyl group), a ureido group, an alkyl group, an alkoxy groups, a nitro group, a cyano group and a halogen atom.

The above substituted or unsubstituted aralkyloxy group includes, for example, an aralkyloxy group of 1 to 12 carbon atoms. The substituent includes, for example, a sulfonic acid group, a carboxyl group, a phosphoric acid group, a hydroxyl group, an amino group (which may be substituted with an alkyl group, an aryl group and an acetyl group), a ureido group, an alkyl group, an alkoxy group, a nitro group, a cyano group, a heterocyclic group and a halogen atom. Among these groups, a sulfonic acid group, a carboxyl group, a phosphoric acid group and a hydroxyl group are preferable.

The above substituted or unsubstituted alkenyloxy group includes, for example, an alkenyloxy group of 1 to 12 carbon atoms. The substituent includes, for example, a sulfonic acid group, a carboxyl group, a phosphoric acid group, a hydroxyl group, an alkoxy group, an amino group (which may be substituted with an alkyl group, an aryl group and an acetyl group), an aryl group, a halogen atom and a cyano group. Among these groups, a sulfonic acid group, a carboxyl group, a phosphoric acid group and a hydroxyl group are preferable.

The above substituted or unsubstituted alkylamino group includes, for example, an alkylamino group of 1 to 12 carbon atoms. The substituent includes, for example, an ionic and hydrophilic group such as a sulfonic acid group, a carboxyl group or a phosphoric acid group; a hydroxyl group, an alkoxy group, an amino group (which may be substituted with an alkyl group, an aryl group and an acetyl group), an aryl group, a halogen atom and a cyano group. Among these groups, a sulfonic acid group, a carboxyl group, a phosphoric acid group and a hydroxyl group are preferable.

The above substituted or unsubstituted cycloalkylamino group includes, for example, a cycloalkylamino group of 1 to 12 carbon atoms. The substituent includes, for example, a sulfonic acid group, a carboxyl group, a phosphoric acid group, a hydroxyl group, an alkoxy group, an amino group (which may be substituted with an alkyl group, an aryl group and an acetyl group), an aryl group, a halogen atom and a cyano group. Among these groups, a sulfonic acid group, a carboxyl group, a phosphoric acid group and a hydroxyl group are preferable.

The above substituted or unsubstituted arylamino group includes, for example, an anilino group and a naphthylamino group. The substituent includes, for example, a sulfonic acid group, a carboxyl group, a phosphoric acid group, a hydroxyl group, an amino group (which may be substituted with an alkyl group, an aryl group and an acetyl group), a ureido group, an alkyl group, an alkoxy group, a nitro group, a cyano group, a heterocyclic group and a halogen atom. Among these groups, a sulfonic acid group, a carboxyl group, a phosphoric acid group and a hydroxyl group are preferable.

The above substituted or unsubstituted heterocyclic amino group is preferably a five-membered or six-membered ring, which may further be fused and may be an aromatic heterocycle or a nonaromatic heterocycle. The heterocycle includes, for example, pyridine, pyrazine, pyrimidine, pyridazine, triazine, quinoline, isoquinoline, quinazoline, cinnoline, phthalazine, quinoxaline, pyrrol, indole, furan, benzofuran, thiophene, benzothiophene, pyrazole, imidazole, benzimidazole, triazole, oxazole, benzoxazole, thiazole, benzothiazole, isothiazole, benzisothiazole, pyrrolidine, piperidine, piperazine, imidazolidine and thiazoline. These heterocycles may have a substituent, which includes, for example, a sulfonic acid group, a carboxyl group, a phosphoric acid group, a hydroxyl group, an amino group (which may be substituted with an alkyl group, an aryl group and an acetyl group), a ureido group, an alkyl group, an alkoxy group, a nitro group, a cyano group and a halogen atom.

The above substituted or unsubstituted aralkylamino group includes, for example, an aralkylamino group of 1 to 12 carbon atoms. The substituent includes, for example, a sulfonic acid group, a carboxyl group, a phosphoric acid group, a hydroxyl group, an amino group (which may be substituted with an alkyl group, an aryl group and an acetyl group), a ureido group, an alkyl group, an alkoxy group, a nitro group, a cyano group, a heterocyclic group and a halogen atom. Among these groups, a sulfonic acid group, a carboxyl group, a phosphoric acid group and a hydroxyl group are preferable.

The above substituted or unsubstituted alkenylamino group includes, for example, an alkenylamino group of 1 to 12 carbon atoms. The substituent includes, for example, a sulfonic acid group, a carboxyl group, a phosphoric acid group, a hydroxyl group, an alkoxy group, an amino group (which may be substituted with an alkyl group, an aryl group and an acetyl group), an aryl group, a halogen atom and a cyano group. Among these groups, a sulfonic acid group, a carboxyl group, a phosphoric acid group and a hydroxyl group are preferable.

The above substituted or unsubstituted alkylthio group includes, for example, an alkylthio group of 1 to 12 carbon atoms. The substituent includes, for example, a sulfonic acid group, a carboxyl group, a phosphoric acid group, a hydroxyl group, an alkoxy group, an amino group (which may be substituted with an alkyl group, an aryl group and an acetyl group), an aryl group, a halogen atom and a cyano group. Among these groups, a sulfonic acid group, a carboxyl group, a phosphoric acid group and a hydroxyl group are preferable.

The above substituted or unsubstituted cycloalkylthio group includes, for example, a cycloalkylthio group of 1 to 12 carbon atoms. The substituent includes, for example, a sulfonic acid group, a carboxyl group, a phosphoric acid group, a hydroxyl group, an alkoxy group, an amino group (which may be substituted with an alkyl group, an aryl group and an acetyl group), an aryl group, a halogen atom and a cyano group. Among these groups, a sulfonic acid group, a carboxyl group, a phosphoric acid group and a hydroxyl group are preferable.

The above substituted or unsubstituted arylthio group includes, for example, a phenylthio group and a naphthylthio group. The substituent includes, for example, a sulfonic acid group, a carboxyl group, a phosphoric acid group, a hydroxyl group, an amino group (which may be substituted with an alkyl group, an aryl group and an acetyl group), a ureido group, an alkyl group, an alkoxy group, a nitro group, a cyano group, a heterocyclic group and a halogen atom. Among these groups, a sulfonic acid group, a carboxyl group, a phosphoric acid group and a hydroxyl group are preferable.

The above substituted or unsubstituted heterocyclic thio group is preferably a five-membered or six-membered ring, which may further be fused and may be an aromatic heterocycle or a nonaromatic heterocycle. The heterocycle includes, for example, pyridine, pyrazine, pyrimidine, pyridazine, triazine, quinoline, isoquinoline, quinazoline, cinnoline, phthalazine, quinoxaline, pyrrol, indole, furan, benzofuran, thiophene, benzothiophene, pyrazole, imidazole, benzimidazole, triazole, oxazole, benzoxazole, thiazole, benzothiazole, isothiazole, benzisothiazole, pyrrolidine, piperidine, piperazine, imidazolidine and thiazoline. These heterocycles may have a substituent, which includes, for example, a sulfonic acid group, a carboxyl group, a phosphoric acid group, a hydroxyl group, an amino group (which may be substituted with an alkyl group, an aryl group and an acetyl group), a ureido group, an alkyl group, an alkoxy group, a nitro group, a cyano group and a halogen atom.

The above substituted or unsubstituted aralkylthio group includes, for example, an aralkylthio group of 1 to 12 carbon atoms. The substituent includes, for example, a sulfonic acid group, a carboxyl group, a phosphoric acid group, a hydroxyl group, an amino group (which may be substituted with an alkyl group, an aryl group and an acetyl group), a ureido group, an alkyl group, an alkoxy group, a nitro group, a cyano group, a heterocyclic group and a halogen atom. Among these groups, a sulfonic acid group, a carboxyl group, a phosphoric acid group and a hydroxyl group are preferable.

The above substituted or unsubstituted alkenylthio group includes, for example, an alkenylthio group of 1 to 12 carbon atoms. The substituent includes, for example, a sulfonic acid group, a carboxyl group, a phosphoric acid group, a hydroxyl group, an alkoxy group, an amino group (which may be substituted with an alkyl group, an aryl group and an acetyl group), an aryl group, a halogen atom and a cyano group. Among these groups, a sulfonic acid group, a carboxyl group, a phosphoric acid group and a hydroxyl group are preferable.

In the above Formula (5), B represents an alkylene, an arylene or a xylene group. The alkylene group includes, for example, an alkylene group of 1 to 16 carbon atoms, preferably 1 to 6 carbon atoms, and more preferably an ethylene group. The arylene group includes, for example, phenylene and naphthylene group, which may have a sustituent. The substituent includes, for example, a sulfonic acid group, a carboxyl group, a phosphoric acid group, a hydroxyl group, an amino group (which may be substituted with an alkyl group, an aryl group and an acetyl group), a ureido group, an alkyl group, an alkoxy group, a nitro group, a cyano group, a heterocyclic group and a halogen atom.

In the above Formula (5), D and E represent each independently a chlorine atom, a hydroxyl group, an amino group, an alkoxy group (which may be substituted with a substituent selected from a group consisting of a sulfonic acid group, a carboxyl group, a phosphoric acid group, a dialkylamino group, an arylamino group, an acetylamino group, an alkoxy group, an aryl group, a cyano group and a halogen atom), a phenoxyl group (which may be substituted with one or not less than two substituents selected from a group consisting of a sulfonic acid group, a carboxyl group, a phosphoric acid group, a ureido group, an alkyl group and an alkoxy group), a naphthoxyl group (which may be substituted with one or not less than two substituents selected from a group consisting of a sulfonic acid group and an acetylamino group), a benzyloxyl group (which may be substituted with a sulfonic acid group), a phenethyloxyl group (which may be substituted with a sulfonic acid group), an alkylamino group (which may be substituted with a substituent selected from a group consisting of a sulfonic acid group, a carboxyl group, a phosphoric acid group, a hydroxyl group, an alkoxy group, a dialkylamino group, an arylamino group, an aryl group, a halogen atom and a cyano group), an anilino group (which may be substituted with one or not less than two substituents selected from a group consisting of a sulfonic acid group, a carboxyl group, a phosphoric acid group, a hydroxyl group, a dialkylamino group, an arylamino group, an acetylamino group, a ureido group, an alkyl group, an alkoxy group, a nitro group, a cyano group, a heterocyclic group and a halogen atom), a naphthylamino group (which may be substituted with a sulfonic acid group or a hydroxyl group), a benzylamino group (which may be substituted with a sulfonic acid group), a phenethylamino group (which may be substituted with a sulfonic acid group), an alkylthio group (which may be substituted with a sulfonic acid group, a carboxyl group or a hydroxyl group) and an arylthio group (which may be substituted with one or not less than two substituents selected from a group consisting of a sulfonic acid group, a carboxyl group, a hydroxyl group and an alkyl group). At least one of D and E is a group having an ionic and hydrophilic group as a substituent.

Preferable D and E are each independently substituted or unsubstituted amino groups. The substituted amino group is preferably an arylamino group that may have a substituent or an C1-C6 alkylamino group that may have a substituent. The arylamino group that may have a substituent is preferably a phenylamino group or a naphthylamino group that is substituted with an ionic and hydrophilic group. The C1-C6 alkylamino group that may have a substituent is preferably a C1-C6 alkylamino group that is substituted with an ionic and hydrophilic group. Said alkylamino group may be either a mono- or dialkylamino group, but is preferably a monoalkylamino group. A more preferable combination of Y and Z is the case that one is an amino group or a C1-C6 alkylamino group substituted with an ionic and hydrophilic group and the other is a phenylamino or naphthylamino group substituted with an ionic and hydrophilic group. The ionic and hydrophilic group is preferably a sulfonic acid group, a carboxyl group or a hydroxyl group, and more preferably a sulfonic acid group.

Specific examples of combinations of a metal (M) in a metallic compound and an organic amine to be used for producing a phthalocyanine colorant of the present invention are shown in Tables 1 to 7, but are not limited to the following examples. In the Tables, an organic amine is shown in a free acid form.

TABLE 1

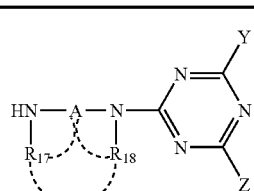

| No. | M | |
|---|---|---|
| 1 | Cu | |

TABLE 1-continued
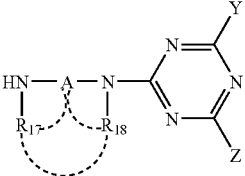
| No. | M |
|---|---|
| 2 | Cu |
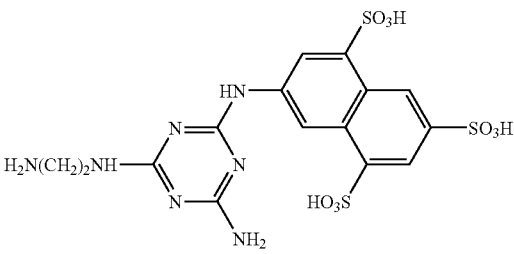
| 3 | Cu |
|---|---|
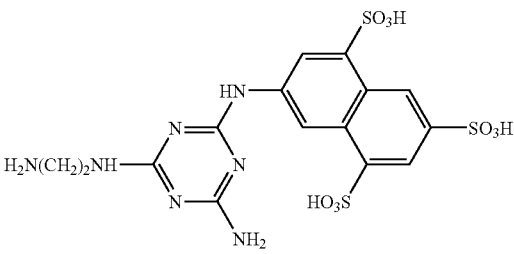
| 4 | Cu |
|---|---|
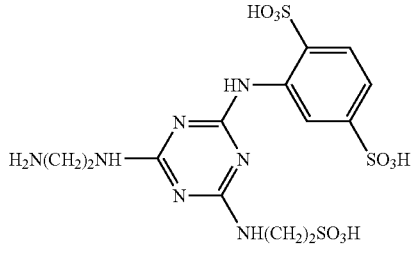
| 5 | Cu |
|---|---|
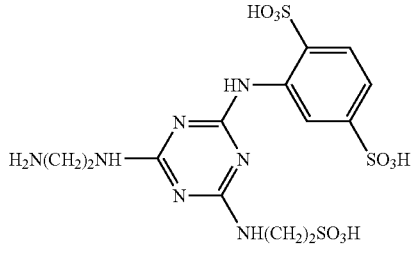
| 6 | Cu |
|---|---|
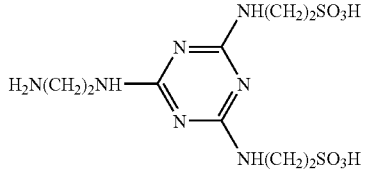

TABLE 1-continued
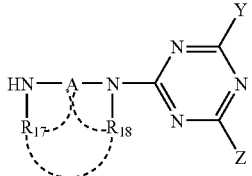
| No. | M | |
|-----|---|---|
| 7 | Cu | 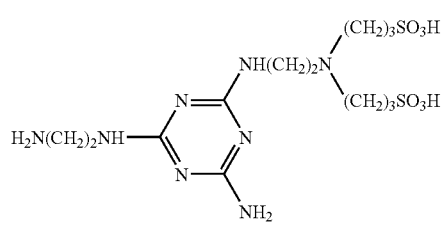 |
TABLE 2
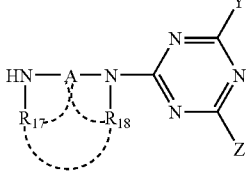
| No. | M | |
|-----|---|---|
| 8 | Cu | 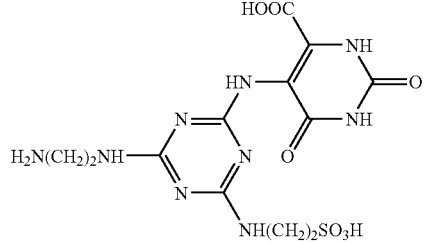 |
| 9 | Cu | 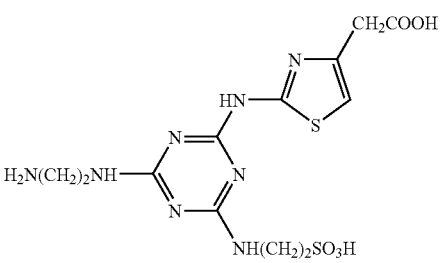 |
| 10 | Cu | 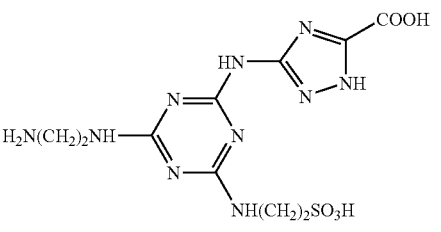 |
TABLE 2-continued
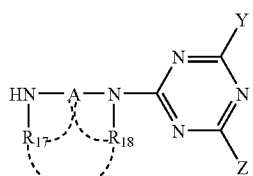
| No. | M | |
|-----|---|---|
| 11 | Cu | 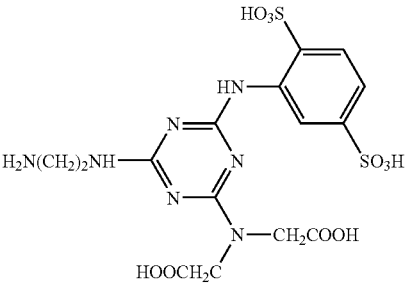 |
| 12 | Cu | 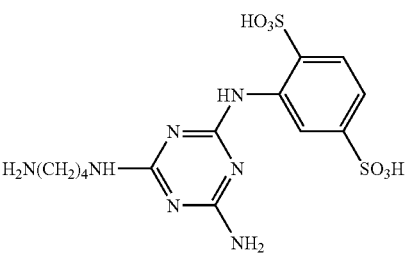 |

TABLE 2-continued

| No. | M | Structure |
|-----|---|-----------|
| 13 | Cu | triazine with H₂N(CH₂)₆NH– and –NH–(2-SO₃H,5-SO₃H-phenyl), and –NH₂ |
| 14 | Cu | triazine with piperazinyl and –NH–(2-SO₃H,5-SO₃H-phenyl), and –NH₂ |

TABLE 3

| No. | M | Structure |
|-----|---|-----------|
| 15 | Cu | triazine with 3-aminophenyl-NH– and –NH–(2-SO₃H,5-SO₃H-phenyl), and –NH₂ |
| 16 | Cu | triazine with 3-(aminomethyl)phenyl-CH₂NH– and –NH–(2-SO₃H,5-SO₃H-phenyl), and –NH₂ |
| 17 | Cu | triazine with 4-aminocyclohexyl-NH– and –NH–(2-SO₃H,5-SO₃H-phenyl), and –NH₂ |

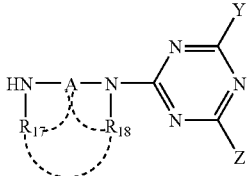

TABLE 4-continued
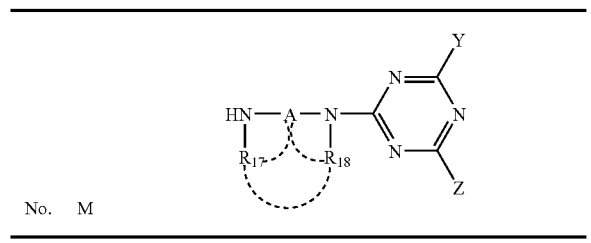
| No. | M | |
|---|---|---|
| 23 | Cu | 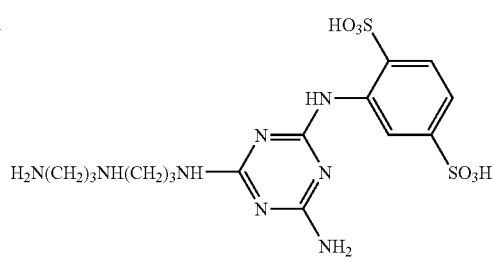 |
| 24 | Cu | 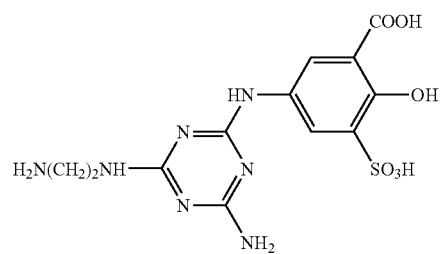 |
TABLE 4-continued
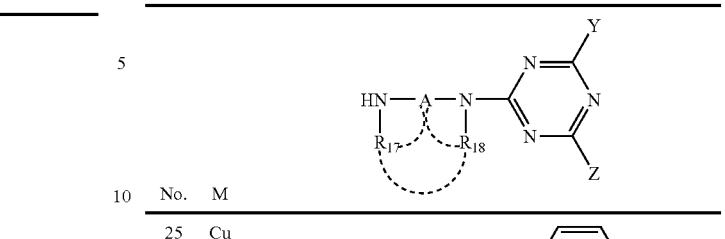
| No. | M | |
|---|---|---|
| 25 | Cu | 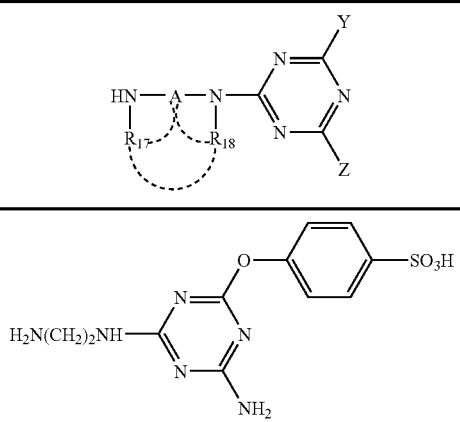 |
| 26 | Cu | 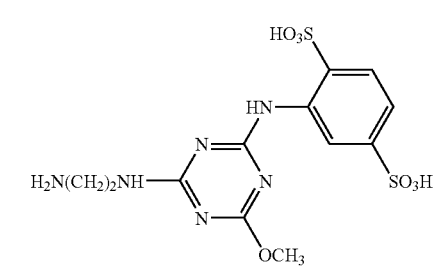 |
| 27 | Cu | 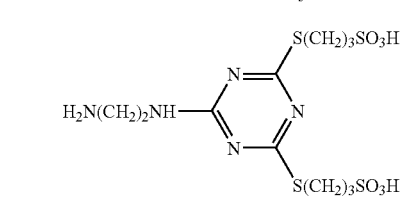 |
TABLE 5
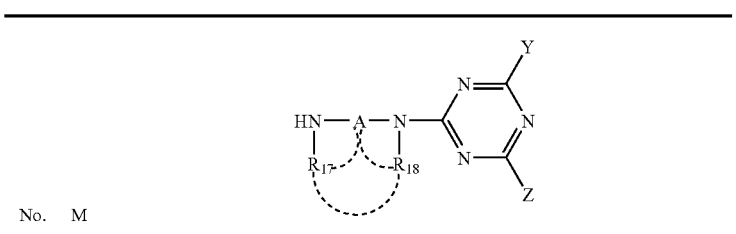
| No. | M | |
|---|---|---|
| 28 | Cu | 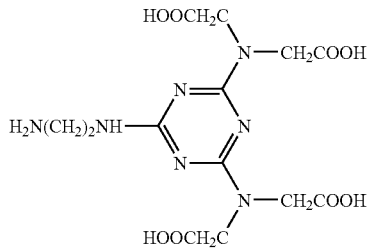 |

TABLE 5-continued
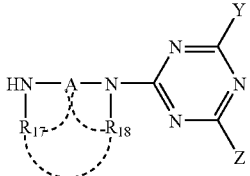
| No. | M |
|-----|---|
| 29 | Cu |
| 30 | Cu |
| 31 | Cu |
| 32 | Cu |
| 33 | Cu |
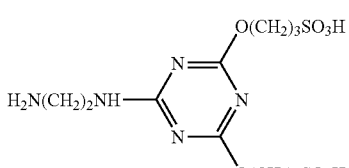
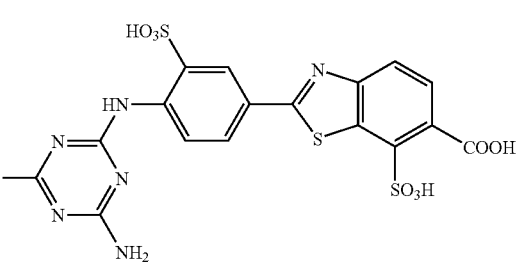
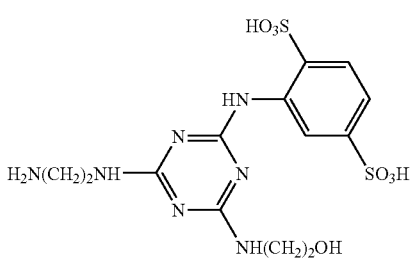
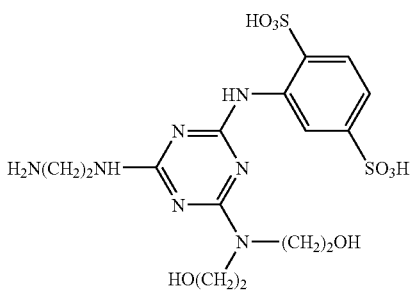
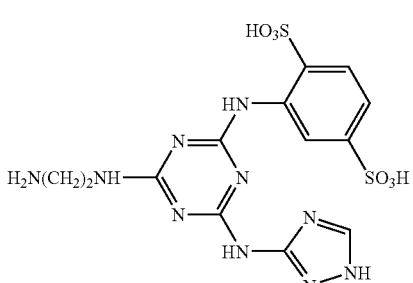

TABLE 6
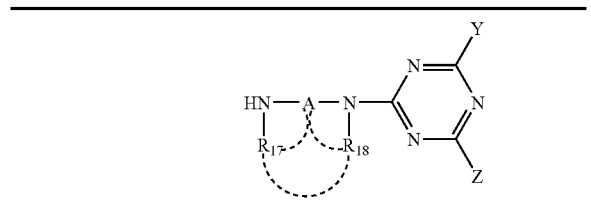
| No. | M |
|---|---|
| 34 | Cu |
| 35 | Cu |
| 36 | Cu |
| 37 | Cu |
TABLE 6-continued
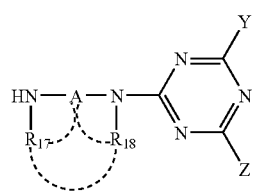
| No. | M |
|---|---|
| 38 | Cu |
| 39 | Cu |
TABLE 7
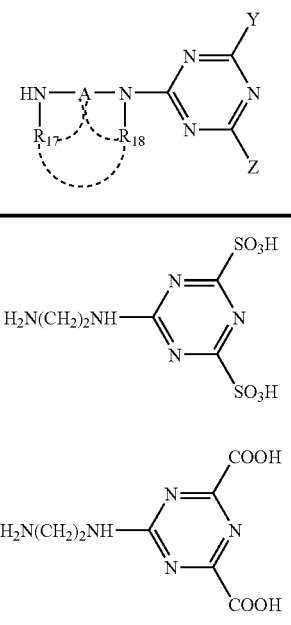
| No. | M |
|---|---|
| 40 | Cu |
| 41 | Cu |

TABLE 7-continued

| No. | M | (structure) |
|---|---|---|
| 42 | Ni | H₂N(CH₂)₂NH—[triazine]—NH—C₆H₃(SO₃H)(SO₃H); NH₂ |
| 43 | Ni | H₂N(CH₂)₂NH—[triazine](NH(CH₂)₂SO₃H)(NH(CH₂)₂SO₃H) |
| 44 | Zn | H₂N(CH₂)₂NH—[triazine]—NH—C₆H₃(SO₃H)(SO₃H); NH₂ |
| 45 | Zn | H₂N(CH₂)₂NH—[triazine](NH(CH₂)₂SO₃H)(NH(CH₂)₂SO₃H) |
| 46 | AlOH | H₂N(CH₂)₂NH—[triazine]—NH—C₆H₃(SO₃H)(SO₃H); NH₂ |
| 47 | AlOH | H₂N(CH₂)₂NH—[triazine](NH(CH₂)₂SO₃H)(NH(CH₂)₂SO₃H) |

A phthalocyanine colorant of the present invention is obtained by subjecting 4-sulfophthalic acid derivatives to reaction with themselves or subjecting a 4-sulfophthalic acid derivative to reaction with a phthalic acid (phthalic anhydride) derivative in the presence of a metallic compound to obtain a compound (sulfophthalocyanine of a substitution type at β-position), followed by reaction of this product with a chlorination agent to convert a sulfonic acid group to a chlorosulfonyl group and further reaction with an amidation agent and an organic amine. 4-Sulfophthalic acid derivative used as a raw material usually contains, as impurities, about 15 to 25% by weight of compounds sulfonated in the 3-position and thus compounds substituted at the α-position, derived from such compounds, are mixed in an objective phthalocyanine colorant. To further enhance effects of the present invention (particularly to obtain an ink with higher ozone fastness), it is preferable to use a raw material containing less impurities sulfonated at the 3-position.

Also in an objective phthalocyanine colorant, compounds formed by decomposition of a part of chlorosulfonyl groups during the reaction are mixed in the reaction product, however, they are not particularly an obstacle. Thus obtained colorant is represented by Formula (14) as shown below and will contain a derivative substituted at the β-position, as a main component, of at least not less than 60%, preferably not less than 70% and more preferably not less than 75%:

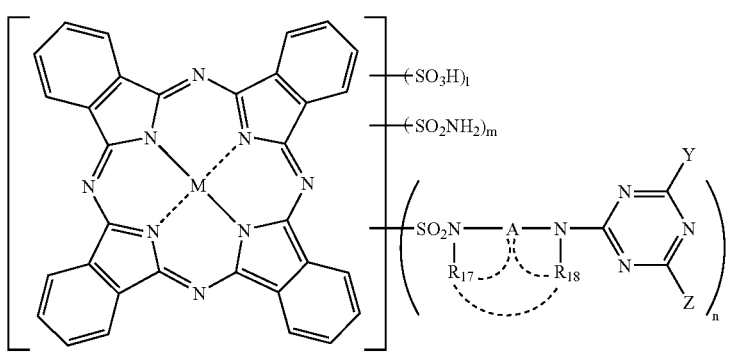

(14)

(In Formula (14), M, $R_{17}$ and $R_{18}$ represent each the same meaning as defined above; l includes 0 and is less than 1, preferably not more than 0.7, more preferably not more than 0.5 and most preferably not more than 0.3; n is not less than 0.3 and preferably not less than 0.7 and not more than 3; m is not less than 1 and not more than 3.7; and the total of l, m and n is not less than 2 and not more than 4; and the values of l, m and n show each an average value in a mixture.)

In producing a phthalocyanine colorant of the present invention, it is preferable to adopt ratio (mole ratio) of an amidation agent to an organic amine represented by Formula (X) such that ratio of an unsubstituted sulfamoyl group to a substituted sulfamoyl group in said phthalocyanine colorant falls in the range of 1:3 to 3:1. High ratio of an unsubstituted sulfamoyl group (high reaction ratio of an amidation agent) gives high ozone fastness of a recorded image by an ink containing thus obtained phthalocyanine colorant, while the colorant tends to have low water-solubility and cause bronze phenomenon. In contrast, high ratio of an organic amine gives high water-solubility of thus obtained phthalocyanine colorant, causing little bronze phenomenon, while low ozone fastness of an image. Therefore, in response to the kind of an organic amine to be used that is represented by Formula (X), ratio of the amidation agent and the organic amine can be adjusted, as appropriate, to obtain good balance.

A method for producing a compound of the present invention represented by Formula (1) will be described.

At first, a metallo phthalocyanine sulfonic acid represented by the above Formula (6) is synthesized. As described above, a compound substituted at the α-position, derived from raw materials is formed as a byproduct in the production of a phthalocyanine colorant of the present invention, but the production method is described here in reference to a compound substituted at the β-position, that is, a main component. A metallo phthalocyanine sulfonic acid represented by Formula (6) can be synthesized, for example, by subjecting 4-sulfophthalic acid derivatives to reacting themselves or subjecting a 4-sulfophthalic acid derivative to reaction with a phthalic acid (phthalic anhydride) derivative in the presence of a catalyst and a metallic compound. By changing reaction mol ratio of a 4-sulfophthalic acid derivative to a phthalic acid (phthalic anhydride) derivative, the number of sulfonyl groups, that is, values of a to d in the Formula can be adjusted. The 4-sulfophthalic acid derivative includes 4-sulfophthalic acid, 4-sulfophthalic anhydride, 4-sulfophthalimide, 4-sulfophthalonitrile, 4- or 5-sulfo-2-cyanobenzamide, 5-sulfo-1,3-diiminoisoindolin or salts thereof. Among these compounds, 4-sulfophthalic acid or a salt thereof is usually preferable. When phthalic acid, phthalic anhydride and phthalimide are used, the addition of urea is essential. Use amount of the urea is 5 to 100 times mol based on 1 mol of a 4-sulfophthalic acid derivative.

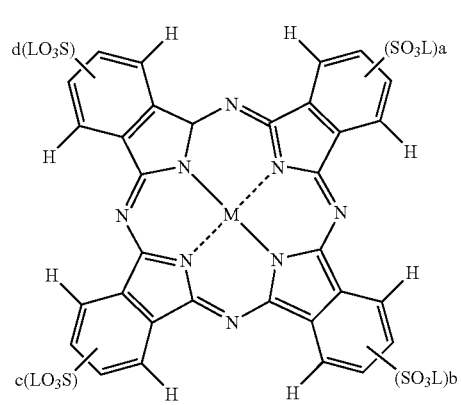

(6)

{In Formula (6), M, L, a, b, c and d represent each the same meaning as above.}

The reaction is usually carried out in the presence of a solvent. An organic solvent of boiling point not lower than 100° C., preferably not lower than 130° C. is used, which includes, for example, n-amyl alcohol, n-hexanol, cyclohexanol, 2-methyl-1-pentanol, 1-heptanol, 1-octanol, 2-ethylhexanol, benzyl alcohol, ethylene glycol, propylene glycol, trichlorobenzene, chloronaphthalene, nitrobenzene, quinoline, sulfolane and urea. Use amount of the solvent is 1 to 100 times by mass of that of a 4-sulfophthalic acid derivative.

The catalyst includes 1,8-diazabicyclo[5,4,0]-7-undecene, ammonium molybdate and boric acid. Amount of the addition is 0.001 to 1 mol based on 1 mol of a 4-sulfophthalic acid derivative.

The metallic compound includes a halide, a carboxylate, a sulfate, a nitrate, an acetylacetonate, a carbonyl compound, a complex, and the like of such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. For example, copper chloride, copper bromide, nickel chloride, nickel acetate, cobalt chloride, cobalt acetate and cobalt acetylacetonate are included. Use amount of the metallic compound is 0.15 to 0.35 times mol based on 1 mol of 4-sulfophthalic acid derivatives or 1 mole of total of a 4-sulfophthalic acid derivative and an (unsubstituted) phthalic acid derivative.

Reaction temperature is usually 100 to 290° C. and preferably 130 to 270° C. Reaction times depend on reaction temperature, but are usually 1 to 8 hours. Phthalocyanine sulfonic acid or a salt form thereof is obtained by filtration, salting out (or acid depositing) and drying after completion of the reaction. When a free acid is desired, for example, the reaction product is precipitated using an acid. When a salt is desired, the reaction product is salted out. When a desired salt is not obtained by salting out, for example, an ordinary method for salt exchanging, where a desired organic or inorganic base is added to the free acid obtained, can be used.

Copper phthalocyanine sulfonic acid or a salt thereof in the above Formula (6), where M is copper, is synthesized by a method described in Literature 8. Copper phthalocyanine sulfonic acid in the above Formula (6), where a, b, c and d are each 1, is obtained by reacting 4-sulfophthalic acid (1 mol), copper chloride (II) (0.3 mol), ammonium phosphomolybdate (0.003 mol), urea (6 mol) and ammonium chloride (0.5 mol) at 180° C. for 6 hours in a sulfolane solvent, however, as reactivity depends on the kinds and use amount of a 4-sulfophthalic acid derivative, a metallic compound, a solvent, a catalyst, and the like, and reaction conditions are not limited to the above.

By subjecting phthalocyanine sulfonic acid or a salt thereof represented by Formula (6) to reaction with a chlorination agent in a solvent such as an organic solvent, sulfuric acid, fuming sulfuric acid or chlorosulfonic acid, phthalocyanine sulfonyl chloride represented by Formula (8) is obtained. The chlorination agent is preferably used in excess to a sulfonic acid group of phthalocyanine sulfonic acid or a salt thereof, and is about 1 to 10 times, preferably not less than 1.5 times, as mole ratio of the chlorination agent to the sulfonic acid group. The organic solvent to be used in the reaction includes, but is not limited to, such as benzene, toluene, nitrobenzene, chlorobenzene, N,N-dimethylformamide and N,N-dimethylacetoamide. The chlorination agent includes, but is not limited to, such as chlorosulfonic acid, thionyl chloride, sulfuryl chloride, phosphorus trichloride, phosphorus pentachloride and phosphorus oxychloride. With regard to a phthalocyanine colorant of the present invention, impurities may be formed by chlorination of a phthalocyanine nucleus and mixed in the reaction product.

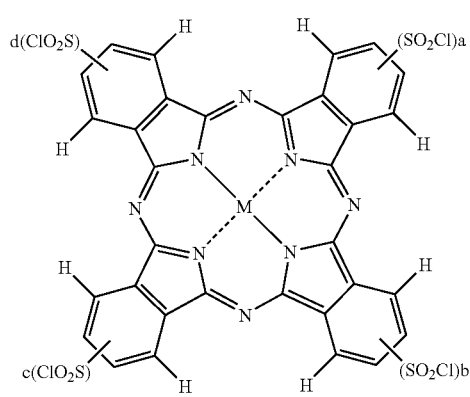

(8)

(wherein M, a, b, c and d represent each the same meaning as above.)

Thus obtained phthalocyanine sulfonyl chloride is then reacted with an organic amine corresponding to an amidation agent and represented by Formula (X) as shown below in water solvent usually at pH 6 to 10, usually at 5 to 70° C. and usually for 1 to 20 hours to obtain an objective compound. The total use amount (mole ratio) of an amidation agent and the above organic amine is preferably not less than the equimolar ratio to the sulfonyl chloride group of the above phthalocyanine sulfonyl chloride, usually 1 to 20 times by mole and preferably 1.5 to 5 times by mole. The use ratio of the above organic amine may be decided according to the ratio of substituted sulfamoyl groups of the objective compound.

An amidation agent to be used in the reaction, which is an agent for introducing an —$NH_2$ group, includes, but is not limited to, for example, an ammonium salt such as ammonium chloride and ammonium sulfate; urea, ammonia water and ammonia gas.

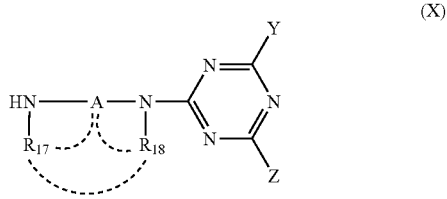

(X)

(In Formula (X), $R_{17}$, $R_{18}$, A, Y and Z represent each the same meaning as above.)

Use amount of the organic amine is usually not less than the theoretical value based on 1 mol of a phthalcyanine compound. The amount has not the upper limit, but is not more than 10 times by mole from economical standpoint. The amount depends on reactivity of an organic amine and reaction conditions and is not limited to the above amount.

A method for producing a corresponding organic amine represented by Formula (X) will be described. For example, amines, alcohols or thiols, corresponding to Y, of usually 0.95 to 1.1 mol and 2,4,6-trichloro-5-triazin (cyanuric chloride) of 1 mol are reacted in water usually at pH 3 to 7, usually at 5 to 40° C. and usually for 2 to 12 hours to obtain a primary condensate. Next, amines, alcohols or thiols corresponding to Z of usually 0.95 to 1.1 mol are reacted usually at pH 4 to 10, usually at 5 to 80° C. and usually for 0.5 to 12 hours to obtain a secondary condensate. After that, diamines, corresponding to a crosslinking group, of 1 to 50 mol are reacted usually at pH 9 to 12, usually at 5 to 90° C. and usually for 0.5 to 8 hours to obtain a compound represented by the above Formula (X). Order of condensation can be determined, as appropriate, according to reactivity of each compound and is not limited to the above. With regard to a phthalocyanine colorant of the present invention, a dimer (for example, Pc-L-Pc) or a trimer of a phthalocyanine ring (Pc) linked through a divalent bonding group (L) may be formed and mixed in the reaction product as impurities, wherein the divalent bonding groups (L) present in multiple may be same or different.

The divalent bonding group represented by L includes a sulfonyl group (—$SO_2$—) and —$SO_2$—NH—$SO_2$— and the like. The bonding group may also be a group formed by combining these groups.

Thus obtained phthalocyanine colorant of the present invention can be separated by filtration, and the like, after precipitation with acid or salt out. Salt out is preferably carried out in, for example, acidic to alkaline conditions, preferably in a range of pH 1 to 11. Temperature in salt out is not limited especially, however, salt out is preferably carried out by adding a salt, and the like after heating usually at 40 to 80° C., preferably 50 to 70° C.

A phthalocyanine colorant of the present invention that is synthesized by the above method and represented by the above Formula (1) is obtained in a form of a free acid or a salt thereof. When a free acid is desired, the reaction product is precipitated using an acid. When a salt is desired, the reaction product is salted out. When a desired salt is not obtained by salting out, for example, an ordinary method for salt exchanging, where a desired organic or inorganic base is added to the free acid, can be used.

A cyan ink of the present invention contains a phthalocyanine colorant of the above Formula (1) produced by the above method and is prepared using water as a medium, and when the ink is used as an ink for ink-jet recording, the phthalocyanine colorant with lower content of an anion such as $Cl^-$ and $SO_4^{2-}$ is preferable, and general standard of the total content of $Cl^-$ and $SO_4^{2-}$ is not higher than 5% by weight, preferably not higher than 3% by weight and more preferably not higher than 1% by weight in the phthalocyanine colorant, while not higher than 1% by weight in the ink. To produce a phthalocyanine colorant of the present invention having lower $Cl^-$ and $SO_4^{2-}$, a method for desalting can be applied using, for example, an ordinary method using a reverse osmosis membrane or a method for subjecting a dried solid or a wet cake of a phthalocyanine colorant of the present invention to stirring in a mixed solvent of an alcohol and water, followed by filtering and drying. An alcohol to be used is a lower alcohol of 1 to 4 carbon atoms, preferably 1 to 3 carbon atoms and more preferably methanol, ethanol or 2-propanol. In desalting using an alcohol, a method for desalting by heating the alcohol to near boiling point thereof and then cooling can also be adopted. The content of $Cl^-$ and $SO_4^-$ is measured by, for example, an ion chromatography.

In using a cyan ink of the present invention as an ink for ink-jet recording, it is preferable to use a phthalocyanine colorant having a lower content of a heavy metal (ion) such as zinc and iron and a metal (cation) such as calcium and silica {except a metal (M in Formula (1)) contained in phthalocyanine skeleton}. A general standard content in a purified and dried phthalocyanine colorant is, for example, not higher than about 500 ppm for each heavy metal (ion) such as zinc and iron and a metal (cation) such as calcium and silica. The content of a heavy metal (ion) and a metal (cation) is measured by an ion chromatography, an atomic absorption analysis or an ICP (Inductively Coupled Plasma) emission analysis.

An ink of the present invention contains 0.1 to 8% by mass, preferably 0.3 to 6% by mass of a phthalocyanine colorant of the above Formula (1). An ink of a lower concentration type contains 0.1 to 2.5% by mass of a phthalocyanine compound of the present invention.

An ink of the present invention is prepared using water as a medium. An ink of the present invention contains 0.3 to 6% by mass of a mixture of a compound of the above Formula (1) obtained as above and has the above conditions or a salt thereof. An ink of the present invention further contains a water-soluble organic solvent, as needed, within the content range not impairing an effect of the present invention. A water-soluble organic solvent is used as a dye-dissolving agent, an agent for prohibiting dryness (a wetting agent), a viscosity modifier, a penetration promoter, a surface tension modifier, an antifoaming agent, and the like. Other ink modifiers include known additives such as an antiseptics and fungicide, a pH controller, a chelate agent, an rust preventive, an ultraviolet absorber, a viscosity modifier, a dye-dissolving agent, a fading inhibitor, an emulsion stabilizer, a surface tension modifier, an antifoaming agent, a dispersing agent and a dispersion stabilizer. Content of a water-soluble organic solvent is 0 to 60% by weight, preferably 10 to 50% by weight based on the total amount of an ink. An ink modifier is preferably used in 0 to 20% by weight, preferably 0 to 15% by weight based on the total amount of an ink. The remainder other than the above is water. A water-soluble organic solvent that can be used in the present invention includes, for example, $C_{1-4}$ alkanols such as methanol, ethanol, n-propanol, isopropanol, n-butanol, isobutanol, sec-butanol and tert-butanol; carboxamides such as N,N-dimethyl formamide and N,N-dimethyl acetamide; heterocycle ketones such as 2-pyrrolidone, N-methyl-2-pyrrolidone, 1,3-dimethylimidazolidin-2-one and 1,3-dimethylhexahydropyrimid-2-one; ketones or keto-alocohols such as acetone, methyl ethyl ketone and 2-methyl-2-hydroxypentane-4-one; cyclic ethers such as tetrahydrofuran and dioxane; monomers or oligomers or polyalkylene glycols having $(C_{2-6})$ alkylene unit such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, thiodiglycol, polyethylene glycol and polypropylene glycol; polyol(triol) such as thioglycol, glycerine and hexane-1,2,6-triol; alkyl ethers of polyhydric alcohols such as ethylene glycol monomethyl ether, ethylene glycol monoethyl ether, diethylene glycol monomethyl ether, diethylene glycol monoethyl ether, triethylene glycol monomethyl ether and triethylene glycol monoethyl ether; γ-butyrolactone and dimethylsulfoxide.

In an ink according to the present invention, a preferable water-soluble organic solvent includes a mono- or polyhydric alcohol having carbon atoms of 3 to 8, and 2-pyrrolidone which may have a substituent of an alkyl group having carbon atoms of 1 to 3, and the like, and as a polyhydric alcohol, one having 2 to 3 hydroxyl groups is preferable. Typically, isopropanol, glycerine, mono, di- or triethylene glycol, dipropylene glycol, 2-pyrrolidone and N-methyl-2-pyrrolidone, butanol, and the like are included and isopropanol, glycerine, diethylene glycol and 2-pyrrolidone are more preferable. These water-soluble organic solvents are used alone or in combination.

An antiseptics and fungicide include organosulfur type, organonitrogen sulfur type, organohalogen type, haloarylsulfone type, iodopropargyl type, N-haloalkylthio type, benzthiazole type, nitrile type, pyridine type, 8-hydroxyquinoline, isothiazoline type, dithiol type, pyridine oxide type, nitropropane type, organotin type, phenol type, quaternary ammonium salt type, triazine type, thiadiazine type, anilide type, adamantane type, dithiocarbamate type, brominated indanone type, benzylbromacetate type, inorganic salts, etc. An organohalo type compounds include, for example, sodium pentachlorophenolate, and pyridine oxide type compounds include, for example, 2-pyridinethiol-1-oxide sodium salt, and inorganic salt type compounds include, for example, anhydrous sodium acetate, and isothiazoline type compounds include, for example, 1,2-benzisothiazoline-3-one, 2-n-octyl-4-isothiazoline-3-one, 5-chloro-2-methyl-4-isothiazoline-3-one, 5-chloro-2-methyl-4-isothiazoline-3-one magnesium chloride, 5-chloro-2-methyl-4-isothiazoline-3-one calcium chloride and 2-methyl-4-isothiazoline-3-one calcium chloride, and the like. Other antiseptics and fungicide includes sodium sorbate, sodium benzoate, and the like (for example, Proxcel GXL(S) (trade name)) and Proxcel XL-2 (S)(trade name), and the like manufactured by Abesia Co., Ltd.).

As for a pH adjustor, any substance can be used as far as it can control pH of an ink within the range of 6.0 to 11.0 to improve storage stability of an ink. For example, alkanolamines such as diethanolamine and triethanolamine; alkali metal hydroxides such as lithium hydroxide, sodium hydroxide, potassium hydroxide and ammonium hydroxide; and alkali metal carbonates such as lithium carbonate, sodium carbonate and potassium carbonate are included.

Chelate agents include, for example, sodium ethylendiaminetetraacetate, sodium nitrilotriacetate, sodium hydroxyethylethylenediamine triacetate, sodium diethylenetriamine pentaacetate, sodium uramildiacetate, etc. Rust preventives include, for example, acidic sulfite, sodium thiosulfate, ammonium thioglycolate, diisopropylammonium nitrite, pentaerithritol tetranitrate, dicyclohexylammonium nitrite, etc.

An ultraviolet absorber, for example, a benzophenone type compound, a benzotriazole type compound, a cinnamic acid type compound, a triazine type compound, a stilbene type compound, or a compound which emits fluorescence by absorbing ultraviolet rays, represented by a benzoxazole type compound, a so-called fluorescent brightening agent can also be used.

As a viscosity modifier, a water soluble polymer compound is exemplified besides a water soluble organic solvent including, for example, polyvinyl alcohol, cellulose derivatives, polyamine, polyimine, and the like.

A dye solubilizer includes, for example, urea, e-caprolactam, ethylene carbonate, and the like.

An fading inhibitor is used to improve image storage ability. As the discoloration inhibitor, various kinds of an organic series or a metal complex series discoloration inhibitor can be used. Organic fading inhibitors include, for example, hydroquinones, alkoxyphenols, dialkoxyphenols, phenols, anilines, amines, indanes, chromans, alkoxyanilines and heterocycles. Metal complexes include nickel complex, zinc complex, etc.

A surface tension modifier includes surfactants such as anionic surfactants, amphoteric surfactants, cationic surfactants and nonionic surfactants. Anionic surfactants include salts such as alkylsulfocarboxylate, α-olefinsulfonate, polyoxyethylene-alkylether acetate, N-acylamino acids and their salts, N-acyl-methyltaurine salts, alkylsulfate polyoxyalkylethersulfate, alkylsulfate polyoxyethylenealkyletherphosphate, rosin acid soap, castor oil sulfate, lauryl alcohol sulfate, alkylaryl sulfonate, diethyl sulfosuccinate, diethylhexyl sulfosuccinate, dioctyl sulfosuccinate, along with esters such as alkylphenol phosphate and alkyl phosphate; cationic surfactants include 2-vinylpyridine derivatives and poly(4-vinylpyridine) derivatives. Amphoteric surfactants include lauryldimethylaminoacetic acid betaine, 2-alkyl-N-carboxymethyl-N-hydroxyethylimidazolium betaine, palm oil fatty acid amide propyl dimethylamino acetic acid betaine, polyoctylpolyaminoethyl glycine and other imidazolidine derivatives. Nonionic surfactants include ethers such as polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkyl ethers and polyoxyethylene aryl alkyl ether; esters such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate and polyoxyethylene stearate; acetylene glycols such as 2,4,7,9-tetramethyl-5-decyn-4,7-diol, 3,6-dimethyl-4-octyn-3,6-diol and 3,5-dimethyl-1-hexyn-3-ol (for example, Surfinol-104, -82, -465, Olfin-STG manufactured by Nisshin Chem Co., Ltd.)

These ink modifiers are used alone or in combination. In this connection, surface tension of an ink according to the present invention is usually 25 to 70 mN/m, more preferably 25 to 60 mN/m. And a viscosity of an ink according to the present invention is preferably not higher than 30 mPa·s. Further, it is more preferable to adjust it to not higher than 20 mPa·s.

As an antifoaming agent, a fluorine-based or a silicone-based compound is used, if necessary.

On producing an ink according to the present invention, order of dissolving each agent is not limited in particular. In preparation of an ink, water used is preferably such one as contains low impurities, such as ion-exchanged water or distilled water. Further, foreign matters may be removed by microfiltration with a membrane filter, and the like, if necessary, and in case of using it as an ink for an ink-jet printer, conducting microfiltration is preferable. A pore diameter in microfiltration is usually 1 micrometer to 0.1 micrometer, preferably 0.8 micrometer to 0.2 micrometer.

An ink according to the present invention can be used not only for monochrome image formation, but also for full-colored image formation. For full-colored image formation, it is also used as an ink set together with a magenta ink, yellow ink, and black ink. Further, to form an image with high resolution, it is also used as an ink set together with a light magenta ink, blue ink, green ink, orange ink, dark yellow ink, grey ink, and the like.

As a colorant applicable to a yellow ink, various types can be used. For example, it includes aryl or heterylazo dyes having phenols, naphthols, anilines, heterocyclics such as pyrazolone and pyridone, and open chain type active methylene compounds as a bonding component (hereinafter called as a coupler component); azomethine dyes having open chain type active methylene compounds as a coupler component; methine dyes such as benzylidene dyes, monomethine oxonol dyes, and the like; quinone type dyes such as naphthoquinone dyes, anthraquinone dyes, and the like; and as other types of dyes, quinophthalone dyes, nitro-nitroso dyes, acridine dyes, acridinon dyes, and the like.

As a colorant applicable to a magenta ink, various types can be used. For example, it includes arylazo dyes having phenols, naphthols, anilines as a coupler component; azomethine dyes having pyrazolones and pyrazolotriazoles as a coupler component; methine dyes such as arylidene dyes, styryl dyes, merocyanine dyes, cyanine dyes, oxonol dyes, and the like; carbonium dyes such as diphenylmethane dyes, triphenylmethane dyes, and xanthene dyes; quinone dyes such as naphthoquinone dyes, anthraquinone dyes, and anthrapyridone dyes; and fused polycyclic dyes such as dioxazine dyes; and the like.

Each colorant described above may exhibit each color of yellow, magenta and cyan for the first time after a part of chromophores is dissociated, and in that case, a counter cation may be an inorganic cation of such as an alkali metal or ammonium, or an organic cation such as pyridinium and a tertiary ammonium salt, and further a polymer cation which has these as partial structure thereof. As a black colorant applicable, a dispersion of carbon black can be exemplified besides disazo, trisazo and tetraazo dyes.

An ink according to the present invention can be used in a recording method such as in printing, duplication, marking, writing, drafting, stamping, and the like, and particularly is suitable for use in ink-jet printing.

An ink-jet recording method according to the present invention affords energy to an ink prepared as described above, and form an image on known image accepting materials, namely a plain paper, a resin-coated paper, a professional paper for an ink-jet, a Glossy paper, a Glossy film, a paper commonly used for electronic photography, a fiber or a cloth (cellulose, nylon, wool, and the like), glass, metal, pottery, leather, and the like.

On forming an image, to furnish gloss or water fastness, or to improve weather fastness, dispersed materials of polymer particulates (also said as polymer latex) may be used together. As for a period during which polymer latex is furnished to a recording material, it may be before, after, or at the same time of providing a colorant, and accordingly also a place of the addition thereof may be in a recording material, or in an ink, or it may be used as a liquid material of a polymer latex alone.

Hereinafter is explained, a recording material (especially, a recording paper and a recording film) used for ink-jet printing using an ink according to the present invention. A backing material in a recording paper and a recording film consists of a chemical pulp such as LBKP, NBKP, and the like; a mechanical pulp such as GP, PGW, RMP, TMP, CTMP, CMP, CGP, and the like; a waste paper pulp such as DIP, and the like; and those produced using various types of apparatus such as Fourdrinier machine, cylinder paper machine, and the like after mixing additives, if necessary, such as a pigment, a binder, a sizing agent, a fastening agent, a cationic agent, a strengthening agent for paper, and the like, can be used. In addition to these backing materials, a synthetic paper and a plastic film and sheet may be used, and backing material thickness is preferably 10 to 250 μm, and basis weight is desirably 10 to 250 g/m$^2$. The backing material may be provided with an ink receiving layer and a back coating layer as it is, or may be provided with an ink receiving layer and a back coating layer after it is provided with a size press or an anchor coat layer with starch or polyvinyl alcohol. Further, the backing material may be subjected to treatment for smoothing with a calendering device such as a machine calender, a TG calender, a soft calender, and the like. In the present invention, as a backing material, a paper laminated with a polyolefin (for example, polyethylene, polystyrene, polyethylene terephthalate, polybutene, and a copolymer thereof) at both surfaces and a plastic film are preferably used. Into a polyolefin, white pigments (for example, titanium oxide, zinc oxide) or toning dyes (for example, cobalt blue, ultramarine blue, neodymium oxide) are preferably added.

In the ink receiving layer provided on the backing material, a pigment or a water-based binder may be contained. As the pigment, a white pigment is preferable, including a white inorganic pigment such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate, and the like; and an organic pigment such as a styrene based pigment, an acrylonitrile based pigment, a urea resin, a melamine resin, and the like. As a white pigment contained in the ink receiving layer, a porous inorganic pigment is preferable, in particular, synthetic amorphous silica having large pore area, and the like are suitable. As the synthetic amorphous silica, a silicic anhydride obtained by a dry production method, and a water-containing silicic acid obtained by a wet production method, can be used, and it is particularly desirable to use a water-containing silicic acid.

As the water-based binder contained in the ink receiving layer, a water-soluble polymer such as polyvinyl alcohol, silanol modified polyvinyl alcohol, starch, cation type starch, casein, gelatin, carboxylmethyl cellulose, hydroxylethyl cellulose, polyvinyl pyrrolidone, a polyalkylene oxide, derivatives of a polyalkylene oxide, and the like, and a water-dispersible polymer such as styrene-butadiene latex, acrylonitrile based emulsion, and the like, are exemplified. These water-based binders can be used alone or in combination with at least two kinds thereof. In the present invention, among these, especially polyvinyl alcohol and silanol modified polyvinyl alcohol are suitable from the points of adhesion property to a pigment, and resistance to peeling-off of an ink receiving layer. The ink receiving layer can contain, besides a pigment and a water-based bonding agent, a mordant, a water fastness modifier, a light fastness improver, a surfactant, and other additives.

As a mordant added in an ink receiving layer, for example, a polymer mordant is used.

A water fastness modifier is effective for modifying water fastness of an image, and as the water fastness modifier, a cationic resin is desirable, in particular. Such a cationic resin includes polyamide polyamine epichlorohydrin, polyethyleneimine, polyamine sulfone, a polymer of dimethyl diallyl ammonium chloride, cationic polyacrylamide, a colloidal silica, and the like, and among these cationic resins, particularly polyamide polyamine epichlorohydrin is suitable. Content of these cationic resins is preferably 1 to 15% by weight, particularly preferably 3 to 10% by weight, based on the total solid portion in an ink receiving layer.

The light fastness improver includes zinc sulfate, zinc oxide, a hindered amine type antioxidant, an ultra violet light absorber such as a benzophenone type and a benzotriazole type absorber, and the like. Among these, zinc sulfate is suitable.

A surfactant functions as a coating coagent, a peel improver, a slide improver, or an antistatic agent. Instead of a surfactant, an organic fluorocompound may be used. A hydrophobic organic fluorocompound is preferable. Examples of the organic fluorocompound include a fluorine-based surfactant, an oily state fluorine-based compound (for example, a fluoro-oil), and a solid state fluorocompound resin (for example, a tetrafluoroethylene resin).

As the other additives added in an ink receiving layer, a pigment dispersing agent, a thickener, an antifoaming agent, dyes, a fluorescent whitener, a preservative, a pH adjustor, a matting agent, a hardener, and the like are exemplified. In this connection, the ink receiving layer may be one layer or two layers.

On a recording paper and a recording film, a back coating layer may be provided, and as a component possible to be added in this layer, a white pigment, a water-based binder, and other components are exemplified. White pigments contained in a backcoat layer includes, for example, white inorganic pigments such as precipitated calcium carbonate, ground calcium carbonate, kaline, talc, calcium sulfate, barium sulfate, titan dioxide, zinc oxide, zinc sulfide, zinc carbonate, satin white, aluminium silicate, diatomite, calcium silicate, magnesium silicate, synthetic amorphous silica, colloidal silica, colloidal alumina, pseudo-boehmite, aluminium hydroxide, alumina, lithopone, zeolite, hydrated halloysite, magnesium carbonate and magnesium hydroxide; and organic pigments such as styrenic plastic pigments, acrylic plastic pigments, polyethylene, microcapsule, a urea-resin and a melanin-resin.

A water-based binder contained in a backcoat layer include poly(styrene-co-maleate salt), poly(styrene-co-acrylate salt); water-soluble polymers such as polyvinyl alcohol, silanol modified polyvinyl alcohol, starch, cationic starch, casein, gelatin, carboxymehthylcellulose, hydroxyehthylcellulose and polyvinylpyrrolidone; and water dispersible polymers such as styrene-butadiene latex, acrylic emulsion, etc. The other components contained in the back coating layer includes an antifoaming agent, a foam inhibiting agent, dyes, a fluorescent whitener, antiseptics, a water fastness modifier, and the like.

In a composing layer of an ink-jet recording paper and a recording film (containing a back coating layer), polymer latex may be added. The polymer latex is used to improve physical properties of a membrane such as for dimensional stabilization, curling prevention, adhesion prevention, and crazing prevention of a membrane. When polymer latex having low glass transition temperature (of not higher than 40° C.) is added in a layer containing a mordant, crazing or curling of the layer can be prevented. Moreover, when polymer latex having high glass transition temperature is added in a back coated layer, curling of the layer can also be prevented.

These recording papers and recording films are generally called as a professional paper for an ink-jet, a Glossy paper or a Glossy film, and they are commercially sold, for example, as Pictoriko (trade name: manufactured by Asahi Glass Co. Ltd.), Color BJ Paper, Exclusive Use Paper for High Grade, Color BJ Photofilm Sheet, Super Photopaper, Professional Photopaper (all of these are trade names: manufactured by Canon Inc.), Paper for Color Image Jet (trade name: manufactured by Sharp Corporation.), Paper for PM Photo, Glossy Film Exclusive for Super Fine Use (all of these are trade names: manufactured by Epson Co., Ltd.), PictaFine (trade name: manufactured by Hitachi Maxell, Ltd.), and the like. Especially, an ink-jet recording method using an ink according to the present invention functions particularly effectively on a recording paper and a recording film having an image receiving layer with an ink, which layer, as a recording material, contains white inorganic pigment particles on a backing material. In this connection, it is surely utilizable also to a plain paper.

A colored article according to the present invention is one obtained by coloring a material to be colored with the above-described ink using an ink-jet printer. A material to be colored is not limited in particular as long as it is the above-described recording material or other materials possible to be colored with an ink-jet printer.

To record on a recording material by an ink-jet recording method according to the present invention, it is enough to record on a recording material in a usual method, for instance, after setting a container containing the above-described ink at a predetermined position of an ink-jet printer. The ink-jet printer, for example, includes a piezo-type printer utilizing mechanical vibration, a bubble-jet printer (trade mark) utilizing foams generated by heating, and the like.

An ink according to the present invention does not precipitate, nor separate during storage. Furthermore, when an ink according to the present invention is used in ink-jet printing, a jetting device (an ink head) is not clogged. An ink according to the present invention does not cause change in physical properties even under constant recirculation for a comparatively long period by a continuous ink-jet printer, or on intermittent use by an on-demand style ink-jet printer.

An ink according to the present invention exhibits a clear cyan color when a preferable colorant is used. Moreover, when an ink according to the present invention is used, a recorded article especially excellent in ozone fastness, light fastness and water fastness can be obtained. By using it as a set of a deep-and-pale ink, a recorded article which is further excellent in ozone resistance, light fastness and water fastness can be obtained. Furthermore, by using it together with other inks such as yellow, magenta and, if necessary, green, red, orange, blue, and the like, color tones of a broad visible range can be exhibited, and a recorded article excellent in ozone fastness, light fastness and water fastness can be obtained.

EXAMPLES AND COMPARATIVE EXAMPLES

Next, the present invention is more specifically explained by Examples. In this connection, "part" and "1%" in the specification are based on weight unless otherwise specified.

Example 1

Synthesis of the compound of Formula (1), wherein M is copper, which has two unsubstituted sulfamoyl groups and two substituted sulfamoyl groups of Formula (3) positioned at the β-position, and in Formula (3), wherein Y is a 2,5-disulfoanilino group, Z is an amino group, A is an ethylene group, and both of R17 and R18 are hydrogen atoms:

(1) Synthesis of Copper Phthalocyanine Tetrasulfonic Acid Tetrasodium Salt (a Substitution Type at the β-Position) (A Compound of FORMULA (6) Wherein, M is Cu, all of a, b, c and d are 1, and L is Na)

To a four-necked flask provided with a cooling tube, 40 parts of sulfolane is added, and a temperature thereof was raised to 180° C. in one hour. Therein, 40 parts of a monosodium salt of 4-sulfophthalic acid, 4.5 parts of ammonium chloride, 55 parts of urea, 0.5 parts of ammonium molybdate, and 6 parts of copper (II) chloride were added, followed by stirring at the same temperature for 6 hours. After the reaction solution was cooled to 40° C., an objective material was filtered with Nutsche, and washed with 400 parts of methanol. Consequently, 300 parts of water was added to a wet cake obtained, and pH thereof was adjusted to 11 using a 48% aqueous solution of NaOH, followed by stirring at 80° C. for one hour. And while stirring, a 35% aqueous solution of hydrochloric acid was added thereto to make pH 3 thereof, followed by gradual adding thereto 80 parts of sodium chloride. Deposited crystals were obtained by filtering and washed with 150 parts of a 20% aqueous solution of sodium chloride to obtain 90 parts of a wet cake. Then, 210 parts of methanol was added thereto, followed by stirring for one hour. Deposited crystals were separated by filtration and washed with 300 parts of a 70% aqueous solution of methanol and dried to obtain 22.9 parts of copper phthalocyanine tetrasulfonic acid tetra sodium salt of a substitution type at the β-position, according to Formula (6), as blue crystals. λmax: 629 nm (in an aqueous solution).

(2) Synthesis of Copper Phthalocyanine Tetrasulfonic Acid Chloride (a Substitution Type at the β-Position)

Into 79 parts of chlorosulfonic acid, 9.8 parts of a copper phthalocyanine tetrasulfonic acid tetrasodium salt were gradually added while stirring at not higher than 60° C., and reaction was carried out at 120° C. for 4 hours. Then reaction solution was cooled to 80° C. and added dropwise 47.6 parts of thionyl chloride over 30 min, and reaction was carried out at 80° C. for 2 hours, then at 90° C. for one hour. The reaction solution was cooled to not higher than 30° C. and slowly poured into 700 parts of ice water. Deposited crystals was separated by filtration, and washed with 200 parts of a 2% aqueous solution of hydrochloric acid cooled with ice to obtain 35.2 parts of a wet cake of copper phthalocyanine tetrasulfonic acid chloride.

(3) Synthesis of the Compound of Formula (X-1) as shown below: (a Compound of Formula (X), wherein Y is a 2,5- disulfoanilino group, Z is an Amino Group, A is an Ethylene Group, both of R17 and R18 are hydrogen atoms.)

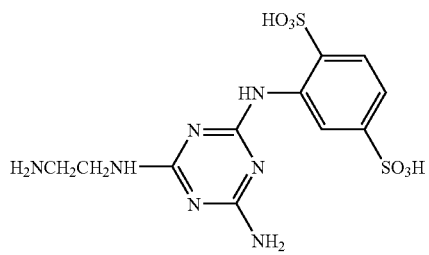

(X-1)

Into 300 parts of ice water, 2.9 parts of Lipar OH and 96.5 parts of cyanuric chloride were ed, followed by stirring for 30 min. Then, 150.8 parts of a monosodium salt of aniline-2,5-disulfonic acid (purity: 91.2%) were added thereto, and reaction was carried out at 10 to 15° C. for 2 hours, then at 25 to 35° C. for 2 hours, while retaining pH thereof at 2.7 to 3.0 by the addition of a 25% aqueous solution of sodium hydroxide. Then, the reaction solution was cooled to not higher than 10° C., and pH thereof was adjusted at 10.0 by the addition of a 25% aqueous solution of sodium hydroxide and 60.7 parts of a 28% aqueous ammonium to the reaction solution, and reaction was carried out at 10 to 15° C. for 2 hours, then at 27 to 30° C. for 2 hours. Then, 600 parts of ethylenediamine was added therein, and reaction carried out at 80° C. for one hour. A solution amount thereof was adjusted to 2000 parts. Sodium chloride(200 parts) was added therein. Concentrated hydrochloric acid was consequently added drop-wise thereto to adjust pH at 1.0 and to deposit crystals. Thus deposited crystals were separated by filtration and washed with 500 parts of a 20% aqueous solution of sodium chloride to obtain 245.9 parts of a wet cake. The wet cake obtained (245.9 parts) was added into 1700 parts of methanol and suspended by adding thereto 90 parts of water and stirring at 60° C. for one hour. Thereafter, by filtration, washing with methanol and drying, 125.8 parts of a compound of Formula (X-1) was obtained.

(4) Synthesis of an Objective Compound (a Compound Substituted at the β-Position)

Into 200 parts of ice water, 35.2 parts of the wet cake of copper phthalocyanine tetrasulfonic acid chloride obtained in (2) was added and suspended therein by stirring. After 10 min, a 28% aqueous ammonium was added dropwise therein while maintaining them at not higher than 5° C., and pH thereof was adjusted to 9.0. Then, 2 parts of an aqueous ammonium and an aqueous solution obtained by dissolving 8.5 parts of a compound of Formula (X-1) into 100 parts of water, were poured into said suspension, and reaction was carried out at 10° C. for 2 hours, 20° C. for 2 hours, and then at 50° C. for one hour while adding a 28% aqueous ammonium thereto to keep pH at 9.0. Water was added thereto to adjust the solution amount to 500 parts, and 100 parts of sodium chloride was added therein to deposit crystals. Thus deposited crystals were separated by filtration and washed with 200 parts of a 20% aqueous solution of sodium chloride to obtain 41.0 parts of a wet cake. Again, it was dissolved in water, and adjusted whole amount thereof to 400 parts. The temperature thereof was raised to 60° C., and 80 parts of sodium chloride were added thereto, then pH thereof was adjusted to 1.0 by the addition of a 35% aqueous solution of hydrochloric acid to deposit crystals. Thus deposited crystals were separated by filtration and washed with 200 parts of a 20% aqueous solution of sodium chloride to obtain 51.5 parts of a wet cake. The wet cake obtained of 51.5 parts was added into 500 parts of methanol, and suspended therein by stirring at 60° C. for one hour. Thereafter, by filtering, washing with methanol, and drying, 8.9 parts of blue crystals were obtained. λmax of this compound was 608.5 nm (in an aqueous solution).

This compound has not less than 75% of a compound substituted at the β-position, and, from the reaction and a added amount of a compound of Formula (X-1), it seem to be a compound of Formula (9) (shown as a free acid form without specifying substituted positions), wherein m is 2 and n is 2. However, as a result of analysis with a liquid chromatograph mass analyzer, a sulfonic acid group was also confirmed. By considering other analyzing results also, value of 1 (a sulfonic acid group) is supposed to be about 0.3, and value of n (a substituted sulfamoyl group) is supposed to be 0.5 to 2, and therefore the residue is m (an unsubstituted sulfamoyl group), and the total of l, m and n is 4 are thought to be close to an actual fact.

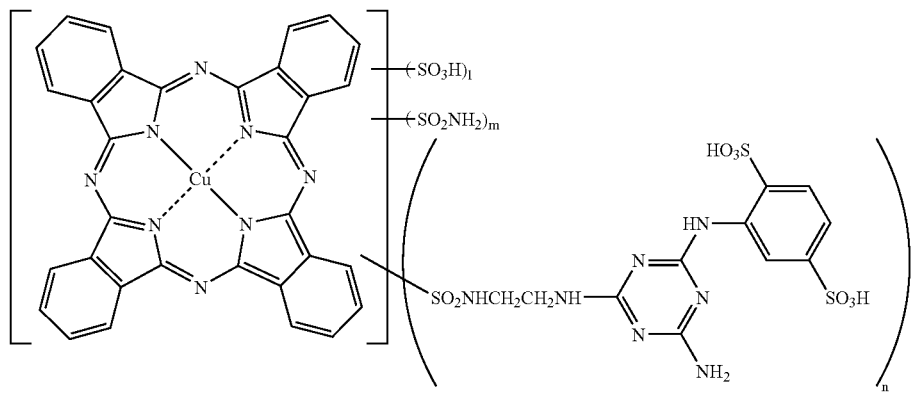

(9)

Example 2

Synthesis of the Phthalocyanine Colorant of Formula (1) which is the same as Example 1 except that in the Colorant of the above Described Example 1, Substituents at the 1-Position were Changed to Three Unsubstituted Sulfamoyl Groups and One Substituted Sulfamoyl Group of Formula (3)

Into 100 parts of ice water, 17.6 parts of the wet cake of copper phthalocyanine tetrasulfonic acid chloride obtained in Example 1 (2) was added and suspended therein by stirring. After 10 min, a 28% aqueous ammonium was drop wise added while maintaining them at not higher than 5° C., to adjust pH thereof to 9.0. Then, 0.5 parts of an aqueous ammonium and an aqueous solution obtained by dissolving 2.1 parts of a compound of Formula (X-1) in 30 parts of water, were poured to the above-described suspension. Reaction was carried out at 10° C. for 2 hours, 20° C. for 2 hours, and then at 50° C. for one hour while maintaining pH at 9.0 by the addition of a 28% aqueous ammonium thereto. Water was added thereto to adjust the solution amount to 250 parts, followed by adding 50 parts of sodium chloride therein, to deposit crystals. Thus deposited crystals were separated by filtration and washed with 100 parts of a 20% aqueous solution of sodium chloride to obtain 22.6 parts of a wet cake. Again, it was dissolved in water to adjust total amount thereof to 250 parts, temperature thereof was raised to 60° C. and 12.5 parts of sodium chloride were added therto, and then pH thereof was adjusted to 1.5 by the addition of a 35% aqueous solution of hydrochloric acid to deposit crystals. Thus deposited crystals were separated by filtration, washed with 200 parts of a 20% aqueous solution of sodium chloride to obtain 33.0 parts of a wet cake. The wet cake obtained of 33.0 parts was added into 330 parts of methanol and suspended therein by further adding 33 parts of water and stirring at 60° C. for one hour. Thereafter, by filtering, washing with methanol and drying, 4.1 parts of blue crystals were obtained. λmax of this compound was 602.5 nm (in an aqueous solution).

This compound has not less than 75% of a compound substituted at the β-position, and from the reaction and a added amount of a compound of Formula (X-1), it seem to be a compound of Formula (9) (shown as a free acid form without specifying substituted positions), wherein m is 3 and n is 1. However, as a result of analysis with a liquid chromatograph mass analyzer, a sulfonic acid group was also confirmed. By considering other analyzing results also, value of 1 (a sulfonic acid group) is supposed to be about 0.3, and value of n (a substituted sulfamoyl group) is supposed to be 0.3 to 1, and therefore the residue is m (an unsubstituted sulfamoyl group), and the total of l, m, and n is 4 are thought to be close to an actual fact.

Example 3

Synthesis of the Phthalocyanine Colorant of Formula (1) which is the same as Example 1 except that, in the Colorant of the above Described Example 1, Substituents at the β-Position were Changed to one Unsubstituted Sulfamoyl Group and Three Substituted Sulfamoyl Groups of Formula (3).

Into 100 parts of ice water, 17.6 parts of the wet cake of copper phthalocyanine tetrasulfonic acid chloride obtained in Example 1 (2) was added and suspended therein by stirring. After 10 minutes, a 28% aqueous ammonium was added dropwise while maintaining them at not higher than 5° C. to adjust pH thereof to 9.0. Then, 1.5 parts of an aqueous ammonium, and an aqueous solution obtained by dissolving 6.4 parts of a compound of Formula (X-1) in 50 parts of water were poured to said suspension. Reaction was carried out at 10° C. for 2 hours, 20° C. for 2 hours, and then at 50° C. for one hour while maintaining pH at 9.0 by the addition of a 28% aqueous ammonium thereto. Water was added thereto to adjust the solution amount to 250 parts, followed by adding 50 parts of sodium chloride therein to deposit crystals. Thus deposited crystals were separated by filtration and washed with 100 parts of a 20% aqueous solution of sodium chloride to obtain 22.0 parts of a wet cake. Again, it was dissolved in water to adjust whole amount thereof to 250 parts, temperature thereof was raised to 60° C., and 50 parts of sodium chloride was added thereto, and then pH thereof was adjusted to 1.0 by the addition of 35% aqueous solution of hydrochloric acid to deposit crystals. Thus deposited crystals were separated by filtration and washed with 100 parts of a 20% aqueous solution of sodium chloride to obtain 21.7 parts of a wet cake. The wet cake obtained of 21.7 parts was added into 220 parts of methanol and suspended therein by adding 10 parts of water and stirring at 60° C. for one hour. Thereafter, by filtering, washing with methanol and drying, 5.8 parts of blue crystals were obtained. λmax of this compound was 612.0 nm (in an aqueous solution).

This compound has not less than 75% of a compound substituted at the β-position, and, from the reaction and added amount of a compound of Formula (X-1), it seem to be a compound of Formula (9) (shown as a free acid form without specifying substituted positions), wherein m is 1 and n is 3. However, as a result of analysis with a liquid chromatograph mass analyzer, a sulfonic acid group was also confirmed. By considering other analyzing results also, value of 1 (a sulfonic acid group) is supposed to be about 0.3, and value of n (a substituted sulfamoyl group) is supposed to be 0.8 to 3, and therefore the residue is m (an unsubstituted sulfamoyl group), and the total of l, m and n is 4 are thought to be close to an actual fact.

Example 4

Synthesis of the Phthalocyanine Colorant of Formula (1) which is the same as Example 1 except that in the Colorant of the above Described Example 1, the Substituted Sulfamoyl Group of Formula (3) was Changed to the Substituted Sulfamoyl Group derived from the Amine of Formula (X-2) as shown below:

(1) Synthesis of the compound of Formula (X-2) as shown below: (a compound of Formula (X), wherein Y is a 4,6,8-trisulfonaphthlene-2-yl-amino group, Z is an amino group, A is an ethylene group; and both of $R_{17}$ and $R_{18}$ are hydrogen atoms.):

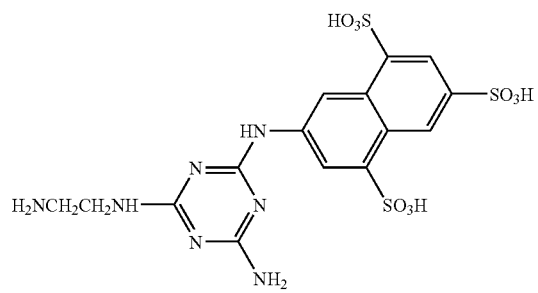

Into 100 parts of ice water, 0.6 parts of Lipar OH and 19.4 parts of cyanuric chloride were added, followed by stirring for 30 min. Then, 74.5 parts of a 2-aminonaphthalene-4,6,8-trisulfonic acid (purity: 51.4%) was added thereto, and reaction was carried out at 10 to 15° C. for 2 hours, and then at 25 to 30° C. for 2 hours while maintaining pH thereof at 2.7 to 3.0 by the addition of a 25% aqueous solution of sodium hydroxide. Then, said reaction solution was cooled to not higher than 5° C., and adjusted to pH 10.0 by the addition of a 25% aqueous solution of sodium hydroxide. To this reaction solution, 12.1 parts of a 28% aqueous ammonium solution was added, and reaction was carried out at 10 to 15° C. for 2 hours, and then at 27 to 30° C. for 2 hours. After the solution amount thereof was adjusted to 700 parts, 140 parts of sodium chloride, and then a 35% hydrochloric acid were added to adjust pH at 6 and thus to deposit crystals. The crystals were separated by filtration to obtain 149.3 parts of a wet cake. Then, amount of a compound of Formula (X-2), it seem to be a compound of Formula (12) (shown as a free acid form without specifying substituted positions), wherein m is 2 and n is 2. However, as a result of analysis with a liquid chromatograph mass analyzer, a sulfonic acid group was also confirmed. By considering other analyzing results also, value of 1 is supposed to be about 0.3, and value of n is supposed to be 0.3 to 2, and therefore the residue is m, and the total of l, m and n is 4 are thought to be close to an actual fact.

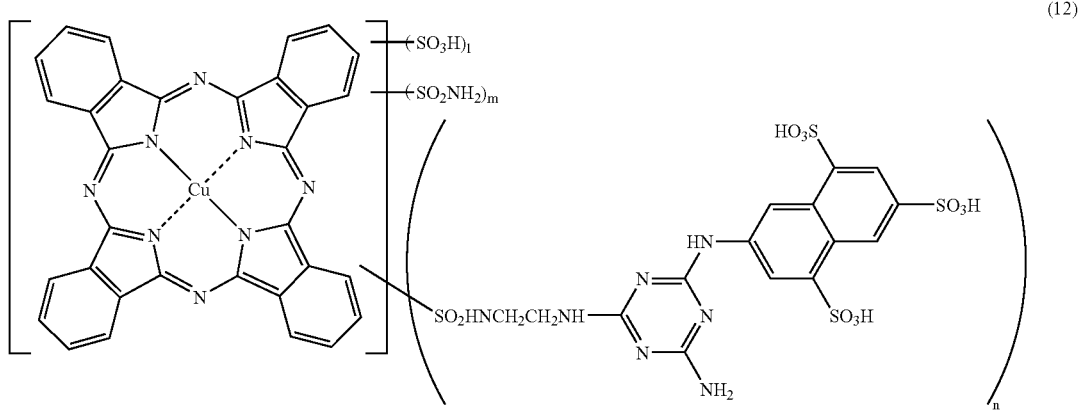

(12)

149.3 parts of the wet cake obtained was added into 120 parts of ethylenediamine and reaction was carried out at 80° C. for one hour. Into the reaction solution, 900 parts of 2-propanol were added to carry out decantation. Methanol (1000 parts) was added to the residue obtained to deposit crystals. By filtering, washing with methanol and drying, 27.7 parts of white crystals were obtained.

(2) The wet cake (17.6 parts) of copper phthalocyanine tetrasulfonic acid chloride obtained in Example 1 (2) were added into 100 parts of ice water to suspend therein by stirring. After 10 minutes, 28% aqueous ammonium was added dropwise thereto while maintaining at not higher than 5° C. to adjust pH thereof to 9.0. Next, 1.0 parts of an aqueous ammonium solution, and an aqueous solution obtained by dissolving 5.8 parts of a compound of Formula (X-1) in 50 parts of water, were poured to said suspension and reaction was carried out at 10° C. for 2 hours, 20° C. for 2 hours, and then at 50° C. for one hour while maintaining pH at 9.0 by the addition of a 28% aqueous ammonium thereto. Water was added thereto to adjust the solution amount to 200 parts and then 40 parts of sodium chloride were added therein to deposit crystals. Thus deposited crystals were separated by filtration and washed with 100 parts of a 20% aqueous solution of sodium chloride to obtain 28.3 parts of a wet cake. Again, it was dissolved in water to adjust total amount thereof to 200 parts, temperature thereof was raised to 60° C., and then 20 parts of sodium chloride were added thereto. Thereafter, pH thereof was adjusted to 1.7 by the addition of a 35% aqueous solution of hydrochloric acid to deposit crystals. Thus deposited crystals were separated by filtration, and then washed with 100 parts of a 10% aqueous solution of sodium chloride to obtain 40.4 parts of a wet cake. The wet cake obtained of 40.4 parts was added into 320 parts of methanol, and suspended therein by adding 16 parts of water and stirring at 60° C. for one hour. Thereafter, by filtering, washing with methanol and drying, 4.5 parts of blue crystals were obtained. λmax of this compound was 603.5 nm (in an aqueous solution).

This compound has not less than 75% of a compound substituted at the β-position, and, from the reaction and added Example 5

Synthesis of the Phthalocyanine Colorant of Formula (1) which is the same as Example 1 except that in the Colorant of the above Described Example 1, the Substituted Sulfamoyl Group of Formula (3) was Changed to the Substituted Sulfamoyl Group derived from the Amine of Formula (X-3) as shown below:

(1) Synthesis of the compound of Formula (X-3) as shown below: (the compound of Formula (X), wherein Y is a 2,5-disulfonanilino group, Z is 2-sulfoethylamino group, A is an ethylene group, and both of $R_{17}$ and $R_{18}$ are hydrogen atoms):

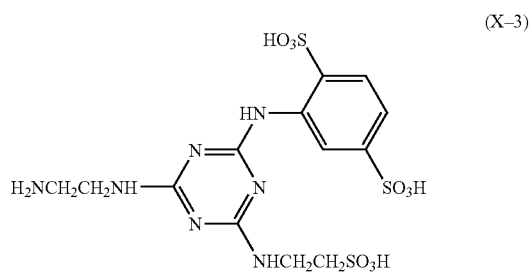

(X-3)

Into 160 parts of ice water, 0.1 parts of Lipar OH and 20 parts of cyanuric chloride were added, followed by stirring for 30 min. Then, 33.2 parts of a monosodium salt of aniline-2,5-disulfonic acid (purity: 91.2%) was added thereoin, and reaction was carried out at 5 to 15° C. for 3 hours while maintaining pH thereof at 4.0 to 4.5 by the addition of a 10% aqueous solution of sodium carbonate. Then, to the reaction solution, 13.8 parts of 2-aminoethanesulfonic acid was added, and reaction was carried out at 15° C. for 0.5 hour at pH of 6.5 to 7.0, and then at 30° C. for 2 hours at pH of 8.0 to 8.5. To 400 parts of the reaction solution, 200 parts of 2-propanol and 60 parts of sodium chloride were sequentially added to deposit crystals. The deposited crystals were separated by filtration, washed with 2-propanol and dried at reduced pressure to obtain 130.2 parts of white crystals. Next, thus obtained 130.2 parts of the white crystals were added into 120 parts of ethylenediamine, and reaction was carried out at 80° C. for one hour.

Into said reaction solution, 800 parts of 2-propanol was added for decantation. To the residue obtained, 600 parts of methanol was added to dissolve the residue and the solution was filtrated. To the filtrate, 1200 parts of 2-propanol was added to deposit crystals. The deposited crystals were separated by filtration, washed with 2-propanol and dried to obtain 41.0 parts of white crystals.

(2) Into 100 parts of ice water, 17.6 parts of the wet cake of copper phthalocyanine tetrasulfonic acid chloride obtained in Example 1 (2) were added and suspended by stirring. After 10 minutes, 28% aqueous ammonium water was added dropwise while maintaining them at not higher than 5° C. to adjust pH thereof to 9.0. Thereafter, 1.0 parts of an aqueous ammonium solution, and an aqueous solution obtained by dissolving 5.1 parts of a compound of Formula (X-3) in 50 parts of water, were poured to said suspension and reaction was carried out at 10° C. for 2 hours, 20° C. for 2 hours, and then at 50° C. for one hour while maintaining pH at 9.0 by the addition of a 28% aqueous ammonium solution thereto. Water was added thereto to adjust the solution amount to 200 parts and 40 parts of sodium chloride was added therein to deposit crystals. Thus deposited crystals were separated by filtration and washed with 100 parts of a 20% aqueous solution of sodium chloride to obtain 25.3 parts of a wet cake. Again, it was dissolved in water to adjust total amount thereof to 200 parts, temperature thereof was raised to 60° C., 40 parts of sodium chloride were added thereto and pH thereof was adjusted to 1.0 by the addition of a 35% aqueous solution of hydrochloric acid to deposit crystals. Thus deposited crystals were separated by filtration, washed with 100 parts of a 20% aqueous solution of sodium chloride to obtain 22.1 parts of a wet cake. The wet cake obtained of 22.1 parts was added into 220 parts of methanol and suspended therein by addition of 11 parts of water and stirring at 60° C. for one hour. Thereafter, by filtering, washing with methanol and drying, 5.3 parts of blue crystals were obtained. λmax of this compound was 608.5 nm (in an aqueous solution).

This compound has not less than 75% of a compound substituted at the β-position, and, from the reaction and added amount of a compound of Formula (X-3), it seem to be a compound of Formula (13) (shown as a free acid form without specifying substituted positions), wherein m is 2 and n is 2. However, as a result of analysis with a liquid chromatograph mass analyzer, a sulfonic acid group was also confirmed. By considering other analyzing results also, value of 1 is supposed to be about 0.3, and value of n is supposed to be 0.5 to 2, and therefore the residue is m, and the total of 1, m and n is 4 are thought to be close to an actual fact.

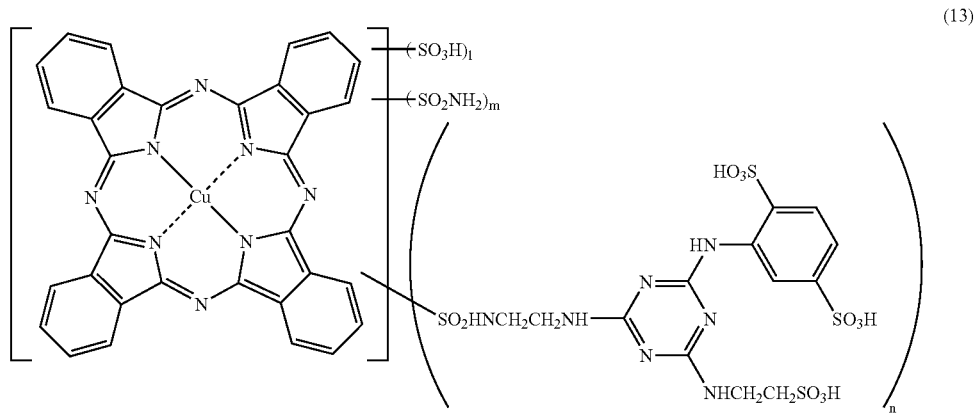

(13)

Example 6

Synthesis of the Phthalocyanine Colorant of Formula (1) which is the same as Example 1 except that in the Colorant of the above Described Example 1, Substituents at the β-Position were Changed to 2.5 Unsubstituted Sulfamoyl Groups and 1.5 Substituted Sulfamoyl Groups of Formula (3).

The wet cake (17.6 parts) of copper phthalocyanine tetrasulfonic acid chloride obtained in Example 1 (2) was added into 100 parts of ice water and suspended therein by stirring. After 10 minutes, 1.0 part of an aqueous ammonium solution, and an aqueous solution obtained by dissolving 3.2 parts of the compound of Formula (X-1) in 60 parts of water, were poured thereto and reaction was carried out at 17 to 20° C. for 9 hours while maintaining pH of 8 to 8.5 by the addition of a 28% aqueous ammonium thereto. Water was added thereto to adjust the solution amount to 250 parts, and then 50 parts of sodium chloride therein were added to deposit crystals. Thus deposited crystals were separated by filtration and washed with 100 parts of a 20% aqueous solution of sodium chloride to obtain 33.0 parts of a wet cake. Again, it was dissolved in water to adjust total amount thereof to 250 parts, after temperature thereof was raised to 60° C., 12.5 parts of sodium chloride were added thereto, and then pH thereof was adjusted to 1.5 by the addition of 35% aqueous solution of hydrochloric acid to deposit crystals. Thus deposited crystals were separated by filtration and washed with 200 parts of a 20% aqueous solution of sodium chloride to obtain 33.0 parts of a wet cake. The wet cake obtained of 33.0 parts was added into 330 parts of methanol, and suspended therein by adding 33.0 parts of water and stirring at 60° C. for one hour. Thereafter, by filtering, washing with methanol and drying, 4.1 parts of blue crystals were obtained. λmax of this compound was 612.1 nm (in an aqueous solution).

This compound has not less than 75% of a compound substituted at the β-position, and, from the reaction and added amount of a compound of Formula (X-1), it seem to be a compound of Formula (9) shown as a free acid form without specifying substituted positions), wherein m is 3 and n is 1. However, as a result of analysis with a liquid chromatograph mass analyzer, a sulfonic acid group was also confirmed. By considering other analyzing results also, value of l (a sulfonic acid group) is supposed to be about 0.2, and value of n (a substituted sulfamoyl group) is supposed to be 0.8 to 1.5, and therefore the residue is m (unsubstituted sulfamoyl groups) (about 2.8 to 3), and the total of l, m and n is 4 are thought to be close to an actual fact.

Example 7

Evaluation of an Ink (A) Preparation of an Ink

An ink was obtained by mixing and dissolving each component as described in Table 8 below, and by filtrating with a 0.45 µm membrane filter (manufactured by Advantec Co., Ltd.). In this connection, ion-exchanged water was used as water. Water and caustic soda (a pH adjustor) were added to make pH of the ink to 8 to 10, and make total amount thereof to 100 parts. As for the ink, the ink using a compound of Example 1 was named C-1, and inks using compounds of Examples 2 to 6 were named C-2 to C-6 in accordance with each number.

TABLE 8

| | |
|---|---|
| Each compound obtained in Examples 1 to 6 | 1.3 parts |
| Water + Caustic soda | 79.6 parts |
| Glycerin | 5.0 parts |
| Urea | 5.0 parts |
| N-methyl-2-pyrrolydone | 4.0 parts |
| IPA (Isopropyl alcohol) | 3.0 parts |
| Butyl carbitol | 2.0 parts |
| Surfinol 104PG50 (Trade name: manufactured by Nissin Chemical Co., Ltd.) | 0.1 parts |
| Total | 100.0 parts |

As a Comparative Example, a colorant for ink-jet recording generally used as Direct Blue 199, product name: Projet Cyan 1 (manufactured by Abesia Chemical Co., Ltd.: Comparative Example 1) and a colorant synthesized and purified by a method as described in Example 1 of the above-described Reference 8 (Comparative Example 2) were formulated for ink in the same method so that the same printing density was obtained on printing as with inks of Examples 1 to 6 in Table 1. An ink using a product of Comparative Example 1 was referred to as C-A, and an ink using a product of Comparative Example 2 was referred to as C-B.

(B) Ink-Jet Printing

Using an ink-jet printer (trade name BJ S630 manufactured by Canon Inc.), ink-jet printing was conducted on two types of glossy Paper A (a paper for PM photograph, KA420PSK manufactured by Epson Co., Ltd) and glossy Paper B (Professional Photopaper, PR-101 manufactured by Canon Inc.).

(C) Evaluation of a Recorded Image

1. Evaluation of Hue

Measurement of hue of a recorded print image was conducted by colorimetry on a recording paper using a colorimetric system (GRETAG SPM50: manufactured by GRETAG Co., Ltd.), and a* and b* values were measured within the range of 50 to 90 of L* of a printed matter. The results were evaluated by 3 stages based on definition of preferable a* value being −50 to −10 and preferable b* value being −50 to −10.

○: both a* and b* values reside in the preferable range.
Δ: only one of a* and b* values resides in the preferable range.
x: both a* and b* values reside outside of the preferable range.

2. Light Fastness Test

A test piece of a recorded print image was irradiated for 50 hours at light intensity of 0.36 W/m², under conditions of temperature in a vessel of 24° C. and humidity of 60% RH, using a xenon weatherometer (Type: Ci4000 manufactured by ATLAS Co., Ltd.). After the test, in the range of reflection density (D value) of 0.7 to 0.85, reflection densities before and after the test were measured using the above-described calorimetric system. After the measurement, residual ratio of colorants was calculated by (reflection density after testing/reflection density before testing)×100 (%), and were evaluated by 3 stages;

○: residual ratio of not lower than 70%;
Δ: residual ratio of 50 to 70%; and
x: residual ratio of lower than 50%.

3. Ozone Fastness

A test piece of a recorded print image was exposed for 3 hours at ozone concentration of 12 ppm, at temperature of 24° C. and at humidity of 60% RH in a vessel, using an ozone weatherometer (Type: OMS-H manufactured by Suga Testing Machine Co., Ltd.). After the test, in the range of reflection density (D value) of 0.7 to 0.85, reflection densities before and after the test were measured using the above-described calorimetric system. After the measurement, residual ratio of colorants was determined by calculation based on (reflection density after testing/reflection density before testing)×100 (%), and evaluation results were ranked by 3 stages:

○: residual ratio of not lower than 70%;
Δ: residual ratio of 40 to 70%; and
x: residual ratio of lower than 40%.

4. Moisture Fastness

A test piece of a recorded print image was stored for 3 days at temperature of 50° C. and at humidity of 90% RH in a vessel, using a thermo-hygrostat (manufactured by Ouyogiken-Sangyosya Co., Ltd.). After the test, bleeding of a test piece was visually evaluated by 3 stages:

○: bleeding is not confirmed;
Δ: slight bleeding is confirmed; and
x: much bleeding is confirmed.

Concerning recorded printing images with inks (C-1 to C-6) using compounds obtained in Examples 1 to 6, evaluation of hue and test results of light fastness, ozone fastness and moisture fastness thereof are shown in Table 9 (Glossy paper A) and Table 10 (Glossy paper B).

TABLE 9

| | Evaluation result of an ink: Glossy paper A | | | |
|---|---|---|---|---|
| Ink No. | Hue | Light Fastness | Ozone F. | Moisture F. |
| C-1 | ○ | ○ | ○ | ○ |
| C-2 | ○ | ○ | ○ | ○ |
| C-3 | ○ | ○ | ○ | ○ |
| C-4 | ○ | ○ | ○ | ○ |
| C-5 | ○ | ○ | ○ | ○ |

TABLE 9-continued

Evaluation result of an ink: Glossy paper A

| Ink No. | Hue | Light Fastness | Ozone F. | Moisture F. |
|---|---|---|---|---|
| C-6 | ○ | ○ | ○ | ○ |
| C-A | ○ | ○ | x | ○ |
| C-B | ○ | ○ | x | ○ |

TABLE 10

Evaluation result of an ink: Glossy paper B

| Ink No. | Hue | Light Fastness | Ozone F. | Moisture F. |
|---|---|---|---|---|
| C-1 | ○ | ○ | ○ | ○ |
| C-2 | ○ | ○ | ○ | ○ |
| C-3 | ○ | ○ | ○ | ○ |
| C-4 | ○ | ○ | ○ | ○ |
| C-5 | ○ | ○ | ○ | ○ |
| C-6 | ○ | ○ | ○ | ○ |
| C-A | ○ | ○ | x | ○ |
| C-B | ○ | ○ | x | ○ |

As apparent from Tables 9 and 10, a cyan ink using a compound of the present invention has excellent hue, along with excellent light fastness, ozone fastness, and moisture fastness. It is apparent that it has particularly excellent ozone fastness.

Example 8

An Ink Set

In an ink-jet printer (trade name: BJ F850 manufactured by Canon Inc.) having a cyan ink set provided with two concentrations of a pale cyan and a deep cyan, C-1 as a pale cyan ink and a genuine cyan ink manufactured by Canon Inc. as a deep cyan ink, were mounted, and ink-jet printing was conducted on two types of Glossy Paper A (a paper for PM photograph, KA420PSK manufactured by Epson Co., Ltd) and Glossy Paper B (Professional Photopaper, PR-101 manufactured by Canon Inc.). As to printing result, there was no generation of dot deletion, and satisfactory clear prints even as full-colored image printing could be obtained. As the result, it was confirmed that an ink according to the present invention can be used in an ink-jet printer having a cyan ink set provided with two concentrations of a pale cyan and a deep cyan.

INDUSTRIAL APPLICABILITY

An ink using a compound of the present invention has a favorable hue as a cyan ink, and the like, and excellent light fastness, ozone fastness and moisture fastness. Further, it does neither exhibit crystal deposition, nor change in physical properties, nor change in color after a long period of storage, and thus storage stability is favorable. Further, by combined use with other magenta ink and yellow ink, color tone can be obtained in a broad visible region. Therefore, the ink using a phthalocyanine colorant according to the present invention, especially a cyan ink, is extremely useful as an ink for ink-jet recording use.

The invention claimed is:

1. A phthalocyanine colorant represented by Formula (1)

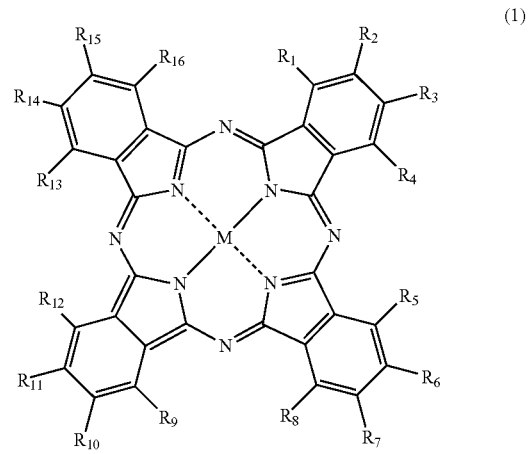

wherein M represents a hydrogen atom, a metal atom, a metal oxide, a metal hydroxide, or a metal halide; $R_2$, $R_3$, $R_6$, $R_7$, $R_{10}$, $R_{11}$, $R_{14}$ and $R_{15}$ each independently represent an unsubstituted sulfamoyl group represented by Formula (2), a substituted sulfamoyl group represented by Formula (3), or a hydrogen atom, provided that at least one of $R_2$, $R_3$, $R_6$, $R_7$, $R_{10}$, $R_{11}$, $R_{14}$ and $R_{15}$ is the unsubstituted sulfamoyl group represented by Formula (2), and at least one thereof is the substituted sulfamoyl group represented by Formula (3); and $R_1$, $R_4$, $R_5$, $R_8$, $R_9$, $R_{12}$, $R_{13}$ and $R_{16}$ represent hydrogen atoms; the sum of a number of the unsubstituted sulfamoyl group and a number of the substituted sulfamoyl group is 2 to 4, and a number of the unsubstituted sulfamoyl group is 1 to 3 and a number of the substituted sulfamoyl group is 1 to

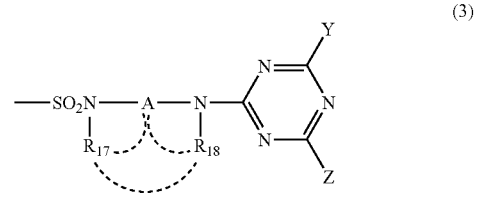

wherein $R_{17}$ and $R_{18}$ each independently represent a hydrogen atom; A represents an alkylene group having 1 to 4 carbon atoms; any one of Y and Z represents, an amino group, or a C1-C6 alkylamino group substituted with a sulfonic acid group or a carboxyl group and the other is a phenylamino group or a naphthylamino group substituted with a sulfonic acid group or a carboxyl group.

2. The phthalocyanine colorant according to claim 1, wherein Formula (1) according to claim 1 is represented by Formula (4) wherein M is Cu:

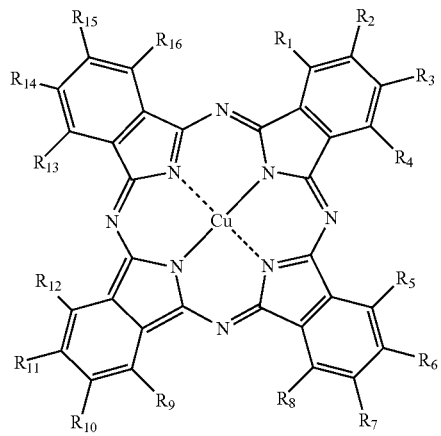

(4)

wherein $R_1$ to $R_{16}$ mean the same as in Formula (1).

3. The phthalocyanine colorant according to claim 1, wherein in each of combinations of $R_2$ and $R_3$, $R_6$ and $R_7$, $R_{10}$ and $R_{11}$, and $R_{14}$ and $R_{15}$, one member of each combination is a hydrogen atom, and the other is an unsubstituted sulfamoyl group represented by Formula (2), a substituted sulfamoyl group represented by Formula (3) or a hydrogen atom, and among $R_2$, $R_3$, $R_6$, $R_7$, $R_{10}$, $R_{11}$, $R_{14}$ and $R_{15}$, at least one is an unsubstituted sulfamoyl group and at least one is a substituted sulfamoyl group represented by Formula (3).

4. The phthalocyanine colorant according to claim 1, wherein content of the colorant of Formula (1) is at least 60% based on the total amount of colorants.

5. The phthalocyanine colorant according to claim 1, wherein the colorant of Formula (1) is obtained by subjecting the phthalocyanine colorant or the salt thereof represented by Formula (6) to a reaction with a chlorinating reagent to convert a sulfonic acid group to a chlorosulfonic acid group, followed by further reaction with an organic amine represented by Formula (X) as shown below and an amidating reagent:

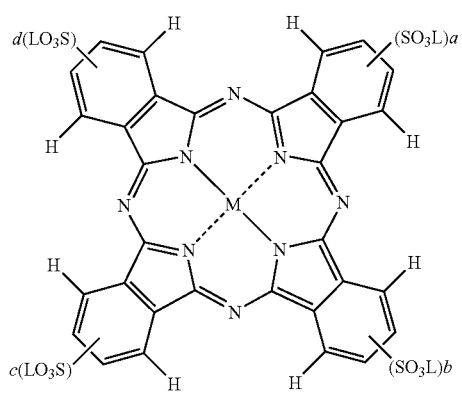

(6)

wherein M represents a hydrogen atom, a metal atom, a metal oxide, a metal hydroxide or a metal halide; L represents a hydrogen atom, an alkali metal ion, an alkali earth metal ion, an onium ion of an organic amine or an ammonium ion; a, b, c and d is 0 or 1, and the sum thereof is an integer of 2 to 4:

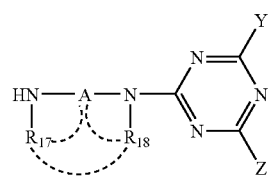

(X)

wherein $R_{17}$, and $R_{18}$ each independently represent a hydrogen atom; A represents an alkylene group having 1 to 4 carbon atoms; any one of Y and Z represents an amino group, or a C1-C6 alkylamino group substituted with a sulfonic acid group or a carboxyl group and the other is a phenylamino group substituted with a sulfonic acid group or a carboxyl group or a naphthylamino group substituted with a sulfonic acid group or a carboxyl group.

6. The phthalocyanine colorant according to claim 5, wherein the metallic compound is a copper compound.

7. An ink comprising, as a colorant component, the phthalocyanine colorant according to any one of claims 1, 2, 3, 4, 5 or 6.

8. An ink comprising the phthalocyanine colorant according to claim 1 and an organic solvent.

9. An ink set comprising at least two kinds of cyan inks having different colorant concentrations, wherein one of them is an ink comprising the phthalocyanine colorant according to claim 1.

10. An ink set comprising at least two kinds of cyan inks having different colorant concentrations, wherein one of them is an ink comprising the phthalocyanine colorant according to claim 1 and an organic solvent.

11. A method for ink-jet recording, comprising jetting ink droplets onto a recording material in response to recording signals, wherein the ink comprises the phthalocyanine colorant according to claim 1.

12. The method for ink-jet recording according to claim 11, wherein the recording material is a sheet for information transmission.

13. The method for ink-jet recording according to claim 12, wherein the sheet for information transmission is a surface-treated sheet and a sheet having an ink image receiving layer which contains white inorganic pigment particles on a backing material.

14. A container comprising an ink comprising the phthalocyanine colorant according to claim 1.

15. An ink-jet printer comprising the container according to claim 14.

16. A container comprising an ink set according to claim 9.

17. An ink-jet printer comprising the container according to claim 16.

18. A colored product which is colored with a phthalocyanine colorant according to claim 1.

19. A colored product which is colored with an ink comprising the phthalocyanine colorant according to claim 1.

20. A colored product which is colored with an ink set according to claim 9.

21. A method for producing a phthalocyanine colorant comprising subjecting derivatives of 4-sulfophthalic acid selected from the group consisting of 4-sulfophthalic acid, 4-sulfophthalic anhydride, 4-sulfophthalimide, 4-sulfophthalonitrile, 4- or 5-sulfo-2-cyanobenzamide, 5-sulfo-1,3-diiminoisoindolin and salts thereof or reaction of said derivatives of 4-sulfophthalic acid to reaction with themselves or subjecting said derivative of 4-sulfophthalic acid to reaction with a derivative of a phthalic acid (anhydride) in the presence of a copper compound to obtain a compound or a salt thereof, which is reacted with a chlorinating reagent to convert a sulfonic acid group to a chlorosulfonyl group, followed by further reaction with an organic amine represented by the following Formula (X)

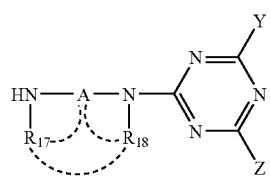

wherein in Formula (X), $R_{17}$ and $R_{18}$ each independently represent a hydrogen atom; A represents an alkylene group having 1 to 4 carbon atoms; any one of Y and Z represents an amino group, or a C1-C6 alkylamino group substituted with a sulfonic acid group or a carboxyl group and the other is a phenylamino group substituted with a sulfonic acid group or a carboxyl group or a naphthylamino group substituted with a sulfonic acid group or a carboxyl group, and an amidating reagent.

22. A phthalocyanine colorant which has not less than 60% of a compound substituted at the β-position and not more than 40% of a compound substituted at the α-position in a phthalocyanine colorant represented by Formula (14) as shown below:

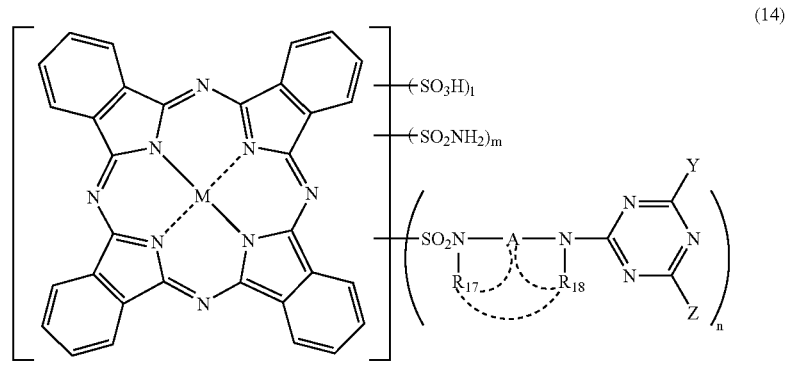

(14)

wherein M represents a hydrogen atom, a metal atom, a metal oxide, a metal hydroxide or a metal halide; l includes 0 and lower than 1; m is not smaller than 0.5 and not larger than 3; n is not smaller than 1 and not larger than 3.5, and the sum of l, m and n is not smaller than 2 and not larger than 4; $R_{17}$ and $R_{18}$ each independently represent a hydrogen atom; and A represents an alkylene group having 1 to 4 carbon atoms; any one of Y and Z represents an amino group, or a C1-C6 alkylamino group substituted with a sulfonic acid group or a carboxyl group and the other is a phenylamino group substituted with a sulfonic acid group or a carboxyl group or a naphthylamino group substituted with a sulfonic acid group or a carboxyl group.

23. The phthalocyanine colorant according to claim 22, wherein M represents a copper atom; A represents an alkylene group having 1 to 4 carbon atoms; l includes 0 and smaller than 1; m is not smaller than 0.5 and not larger than 3; n is not smaller than 1 and not higher than 3; and the sum of l, m and n is 2 to 4; both $R_{17}$ and $R_{18}$ represent hydrogen atoms; any one of Y and Z represents an amino group, or a C1-C6 alkylamino group substituted with a sulfonic acid group or a carboxyl group and the other is a phenylamino group substituted with a sulfonic acid group or a carboxyl group or a naphthylamino group substituted with a sulfonic acid group or a carboxyl group.

* * * * *